US009951929B2

(12) United States Patent
Gordin et al.

(10) Patent No.: US 9,951,929 B2
(45) Date of Patent: Apr. 24, 2018

(54) APPARATUS, METHOD, AND SYSTEM FOR INDEPENDENT AIMING AND CUTOFF STEPS IN ILLUMINATING A TARGET AREA

(71) Applicant: Musco Corporation, Oskaloosa, IA (US)

(72) Inventors: Myron Gordin, Oskaloosa, IA (US); Timothy J. Boyle, Oskaloosa, IA (US); Lawrence H. Boxler, Columbus, IN (US)

(73) Assignee: Musco Corporation, Oskaloosa, IA (US)

( * ) Notice: Subject to any disclaimer, the term of this patent is extended or adjusted under 35 U.S.C. 154(b) by 0 days.

(21) Appl. No.: 15/462,065

(22) Filed: Mar. 17, 2017

(65) Prior Publication Data

US 2017/0191639 A1 Jul. 6, 2017

Related U.S. Application Data

(60) Division of application No. 13/897,979, filed on May 20, 2013, now Pat. No. 9,631,795, which is a (Continued)

(51) Int. Cl.
*B60Q 1/26* (2006.01)
*F21V 14/04* (2006.01)
(Continued)

(52) U.S. Cl.
CPC .............. *F21V 14/04* (2013.01); *F21S 8/003* (2013.01); *F21S 8/088* (2013.01); *F21V 21/30* (2013.01);
(Continued)

(58) Field of Classification Search
CPC .......... F21V 14/04; F21V 29/76; F21V 21/30; F21S 8/003; F21S 8/088
(Continued)

(56) References Cited

U.S. PATENT DOCUMENTS

| | | | |
|---|---|---|---|
| 1,176,475 | A | 3/1916 | McPherson |
| D57,890 | S | 5/1921 | Collier |

(Continued)

FOREIGN PATENT DOCUMENTS

| | | | |
|---|---|---|---|
| EP | 2056020 | A1 | 5/2009 |
| WO | 2005059436 | | 6/2005 |
| WO | 2005059436 | A1 | 6/2005 |

OTHER PUBLICATIONS

Gordin, Myron, et al. "Apparatus, Method and System for Reducing the Effective Projected Area (EPA) of an Elevated Lighting Fixture Without the Use of and External Visor", U.S. Appl. No. 61/708,298, filed Oct. 1, 2012.

(Continued)

*Primary Examiner* — Bryon T Gyllstrom
(74) *Attorney, Agent, or Firm* — McKee, Voorhees & Sease, PLC

(57) ABSTRACT

Presented is a design of modular LED lighting fixture whereby the steps of light directing and light redirecting are independent, but cooperative, so to promote a compact fixture design with low effective projected area (EPA), good thermal properties, and a selectable degree of glare control. A lighting system employing a plurality of said fixtures is highly customizable yet has the potential to be pre-aimed and pre-assembled prior to shipping, which reduces the potential for installation error while preserving the customized nature of the fixtures.

16 Claims, 26 Drawing Sheets

Figure 1A:
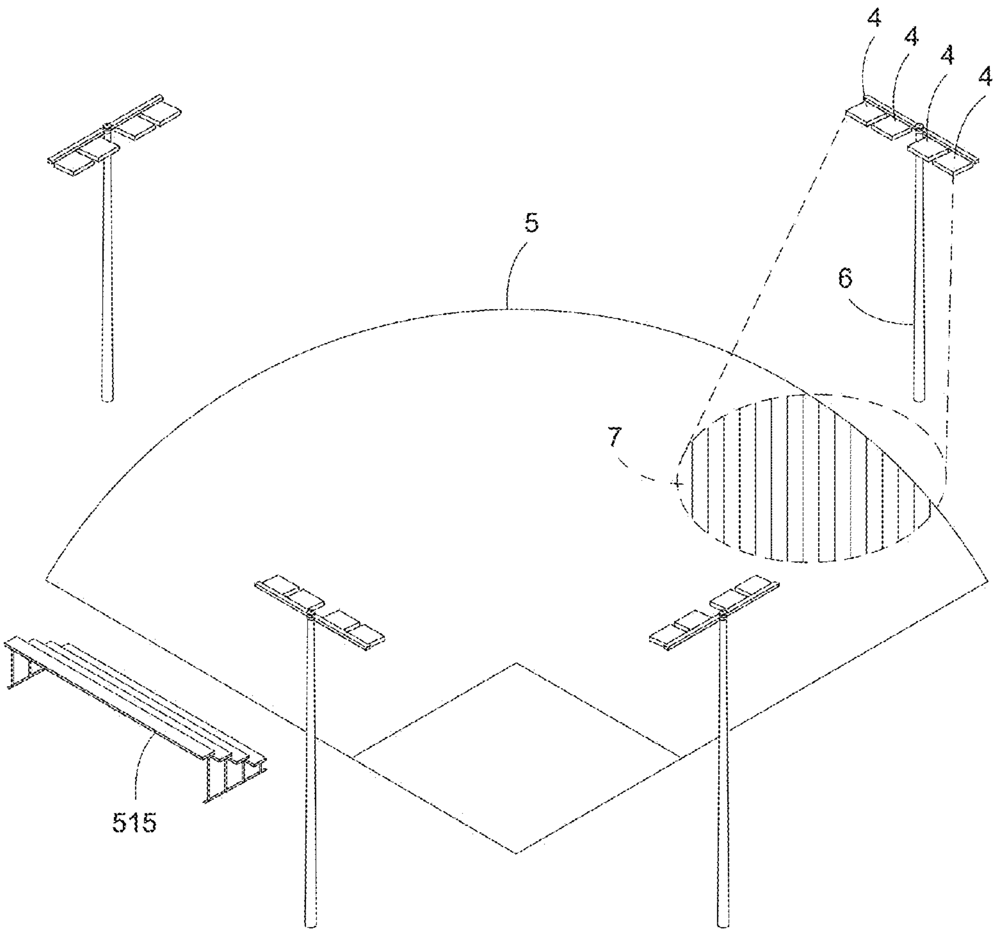

Related U.S. Application Data continuation-in-part of application No. 13/471,804, filed on May 15, 2012, now Pat. No. 8,789,967.

(60) Provisional application No. 61/492,426, filed on Jun. 2, 2011.

(51) Int. Cl.

| | |
|---|---|
| ***F21V 29/76*** | (2015.01) |
| ***F21S 8/08*** | (2006.01) |
| ***F21V 21/30*** | (2006.01) |
| ***F21S 8/00*** | (2006.01) |
| *F21Y 115/10* | (2016.01) |
| *F21W 131/105* | (2006.01) |

(52) U.S. Cl.
CPC ....... *F21V 29/76* (2015.01); *F21W 2131/105* (2013.01); *F21Y 2115/10* (2016.08)

(58) Field of Classification Search
USPC .......................................................... 362/232
See application file for complete search history.

(56) References Cited

U.S. PATENT DOCUMENTS

| | | | | |
|---|---|---|---|---|
| 1,429,722 | A * | 9/1922 | Donahue | B60Q 1/1438 362/324 |
| D191,762 | S | 11/1961 | Rothman et al. | |
| D201,884 | S | 8/1965 | Blake et al. | |
| D255,941 | S | 7/1980 | Grant | |
| D267,005 | S | 11/1982 | Dennis | |
| 4,796,169 | A | 1/1989 | Shemitz | |
| D316,306 | S | 4/1991 | Shemitz | |
| D338,449 | S | 8/1993 | Sahyoun | |
| D364,478 | S | 11/1995 | Pesau | |
| 5,647,661 | A | 7/1997 | Gordin | |
| D387,333 | S | 12/1997 | Pellow et al. | |
| D390,992 | S | 2/1998 | Shemitz | |
| 5,860,733 | A | 1/1999 | Stone et al. | |
| D426,195 | S | 6/2000 | Kuo | |
| D429,703 | S | 8/2000 | Gauffin | |
| D438,135 | S | 2/2001 | DiDomizio et al. | |
| 6,250,596 | B1 | 6/2001 | Gordin et al. | |
| D468,473 | S | 1/2003 | Shemitz et al. | |
| D472,339 | S | 3/2003 | Russello et al. | |
| 6,614,358 | B1 | 9/2003 | Hutchison et al. | |
| 6,626,558 | B2 * | 9/2003 | Momot | A61B 1/247 362/109 |
| D485,636 | S | 1/2004 | Patterson et al. | |
| D507,903 | S | 8/2005 | Pingel | |
| D512,526 | S | 12/2005 | Zucker | |
| 7,059,572 | B2 | 6/2006 | Ware et al. | |
| D530,668 | S | 10/2006 | Carson et al. | |
| 7,209,958 | B2 | 4/2007 | Crookham et al. | |
| 7,325,928 | B2 | 2/2008 | Bhowmik et al. | |
| 7,325,938 | B2 * | 2/2008 | Yoshida | F21S 8/033 362/147 |
| 7,458,700 | B2 * | 12/2008 | Gordin | F21S 2/00 362/235 |
| D595,445 | S | 6/2009 | Gunter | |
| D595,894 | S | 7/2009 | Verfuerth et al. | |
| D616,138 | S | 5/2010 | Lasthein et al. | |
| 7,712,926 | B2 | 5/2010 | Matheson | |
| D621,968 | S | 8/2010 | Schultz | |
| 7,771,087 | B2 | 8/2010 | Wilcox et al. | |
| 7,789,540 | B2 * | 9/2010 | Gordin | F21S 8/086 362/296.02 |
| D629,548 | S | 12/2010 | Cai | |
| 7,845,827 | B2 | 12/2010 | Tarter et al. | |
| D632,006 | S | 2/2011 | Verfuerth et al. | |
| D633,230 | S | 2/2011 | Chen | |
| 7,946,738 | B2 | 5/2011 | Fowler, Jr. et al. | |
| D641,908 | S | 7/2011 | McKee | |
| D644,370 | S | 8/2011 | Lickiss | |
| D659,895 | S | 5/2012 | Maxik et al. | |
| D661,008 | S | 5/2012 | Yuan | |
| D670,421 | S | 11/2012 | Herberholt | |
| D670,422 | S | 11/2012 | Siekmann | |
| D672,902 | S | 12/2012 | Collins et al. | |
| 8,342,709 | B2 | 1/2013 | Lueken et al. | |
| 8,398,273 | B2 | 3/2013 | Eberhardt | |
| 2004/0037068 | A1 * | 2/2004 | Patterson | F21V 7/0016 362/147 |
| 2005/0047138 | A1 | 3/2005 | Rochna | |
| 2005/0265024 | A1 | 12/2005 | Luk | |
| 2006/0245189 | A1 * | 11/2006 | Gordin | F21V 21/30 362/234 |
| 2008/0080189 | A1 | 4/2008 | Wang | |
| 2009/0122550 | A1 | 5/2009 | Gordin et al. | |
| 2009/0262533 | A1 | 10/2009 | Liu et al. | |
| 2010/0020551 | A1 | 1/2010 | Kay et al. | |
| 2010/0110671 | A1 | 5/2010 | Gordin et al. | |
| 2010/0165654 | A1 | 7/2010 | Okubo et al. | |
| 2010/0195326 | A1 | 8/2010 | Boxler et al. | |
| 2010/0328955 | A1 | 12/2010 | Cunningham | |
| 2011/0074313 | A1 * | 3/2011 | Gordin | F21S 8/086 315/294 |
| 2011/0149582 | A1 | 6/2011 | McKee | |
| 2012/0039077 | A1 * | 2/2012 | Householder | G02B 17/086 362/308 |
| 2012/0217897 | A1 | 8/2012 | Gordin et al. | |
| 2012/0307486 | A1 | 12/2012 | Gordin et al. | |
| 2013/0077304 | A1 | 3/2013 | Gordin et al. | |

OTHER PUBLICATIONS

Musco Corporation, PCT/US2012/037935, filed May 15, 2012, "The International Search Report and the Written Opinion of the International Searching Authority, or the Declaration" dated Jan. 29, 2013.

Musco Corporation, PCT/US2013/041863, filed May 20, 2013, "The International Search Report and the Written Opinion of the International Searching Authority, or the Declaration" dated Aug. 28, 2013.

Gordin, Myron, et al., "Apparatus, Method and System for On-Site Evaluation of Illumination Scheme Using Mobile Lighting Evaluation System", U.S. Appl. No. 12/604,572, filed Oct. 23, 2009.

Gordin, Myron, "Apparatus, Method, and System for Lighting Fixture Cooling", U.S. Appl. No. 13/791,941, filed Mar. 9, 2013.

Gordin, Myron, et al. "Domed Downlight Fixture", U.S. Appl. No. 29/433,483, filed Oct. 1, 2012.

Boxler, Lawrenece H., et al. "Apparatus, Method and System for Providing Color LED Output Using Thin-Film Optic Coatings", U.S. Appl. No. 61/804,311, filed Mar. 22, 2013.

Gordin, Myron, et al., "Apparatus, Method and System for On-Site Evaluation of Illumination Scheme Using Mobile Lighting Evaluation System", U.S. Appl. No. 12/604,572, filed Oct. 23, 2009. Mar. 22, 2013.

Gordin, Myron, et al., "Apparatus, Method and System for Lighting Fixture Cooking", U.S. Appl. No. 13/791,941, filed Mar. 9, 2013. Mar. 9, 2013.

Gordin, Myron, et al., "Domed Downlight Fixture", U.S. Appl. No. 29/433,483, filed Oct. 1, 2012. Oct. 1, 2012.

Boxler, Lawrence H., et al., "Apparatus, Method and System fdor Providing Color LED Output Using Thin-Film Optic coatings", U.S. Appl. No. 61/804,311, filed Mar. 22, 2013. Mar. 22, 2013.

Gordin, Myron, et al., "Apparatus, Method and System for Reducing the Effective Projected Area (EPA) of an Elevated Lighting Fixture without the use of an External Visor", U.S. Appl. No. 61/708,298, filed Oct. 1, 2012. Oct. 1, 2012.

Musco Corporation et al., PCT/US2012/037935, International Search Report and Written Opinion of the International Searching Authority, dated Jan. 29, 2013. Jan. 29, 2013.

Musco Corporation, PCT/US2013/041863, filed on May 20, 2013 "The International Search Report and the Written Opinion of the International Searching Authority, or the Declaration", dated Aug. 28, 2011. Aug. 28, 2013.

* cited by examiner

Section A – A

Section A – A

Section A – A

Section A – A

Section A – A

Detail A

APPARATUS, METHOD, AND SYSTEM FOR INDEPENDENT AIMING AND CUTOFF STEPS IN ILLUMINATING A TARGET AREA

CROSS-REFERENCE TO RELATED APPLICATIONS

This Application is a Divisional Application of U.S. application Ser. No. 13/897,979 filed May 20, 2013, and issued as U.S. Pat. No. 9,631,795 of Apr. 25, 2017, which is a Continuation-in-Part of U.S. application Ser. No. 13/471,804, filed May 15, 2012, and issued as U.S. Pat. No. 8,789,967 on Jul. 29, 2014, which claims the benefit of U.S. Provisional Application Ser. No. 61/492,426, filed Jun. 2, 2011, which are hereby incorporated by reference in their entireties.

I. BACKGROUND OF THE INVENTION

The present invention generally relates to apparatus, systems, and methods by which a target area is adequately illuminated by one or more lighting fixtures, each of which employs a plurality of amiable light sources. More specifically, the present invention relates to improvements in the design and use of modular light-emitting diode (LED) lighting fixtures such that the compact nature of the fixture is not compromised while flexibility in addressing the lighting needs of a particular application (e.g., sports lighting) is increased.

Figure 1B:
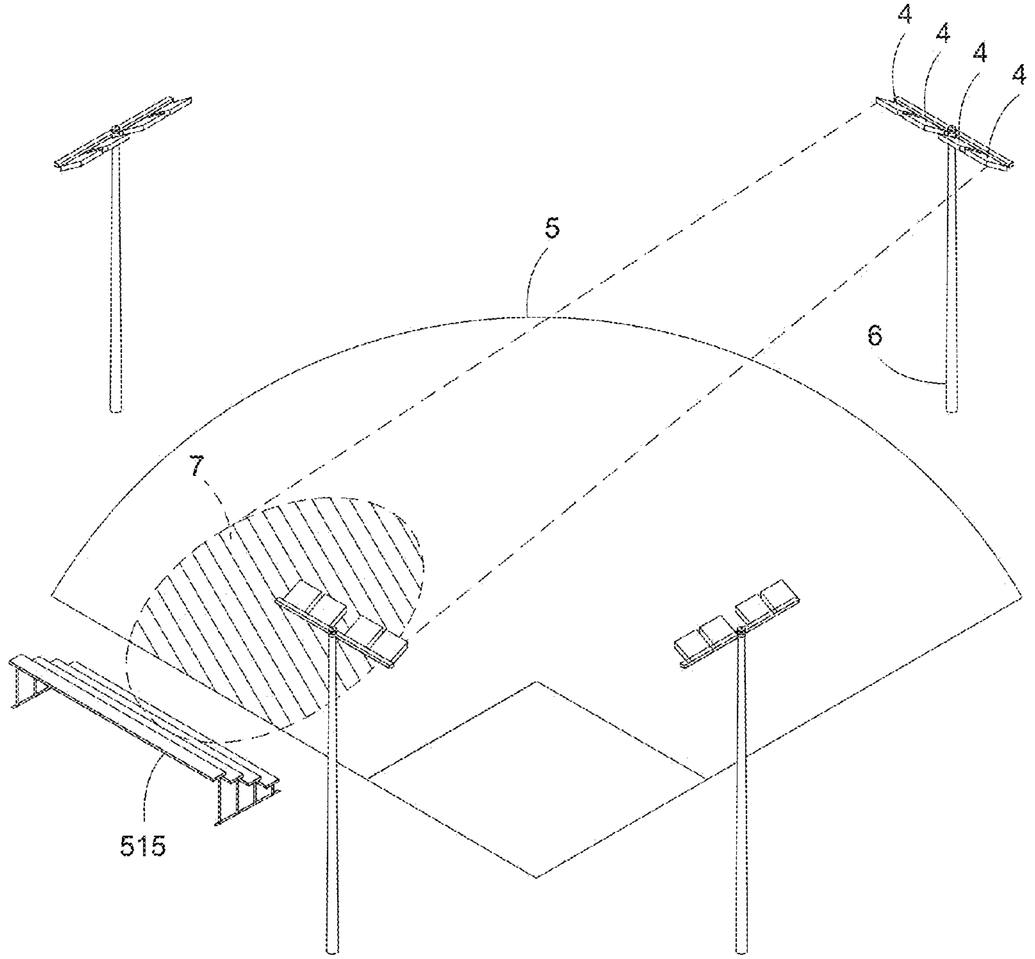
Figure 1C:
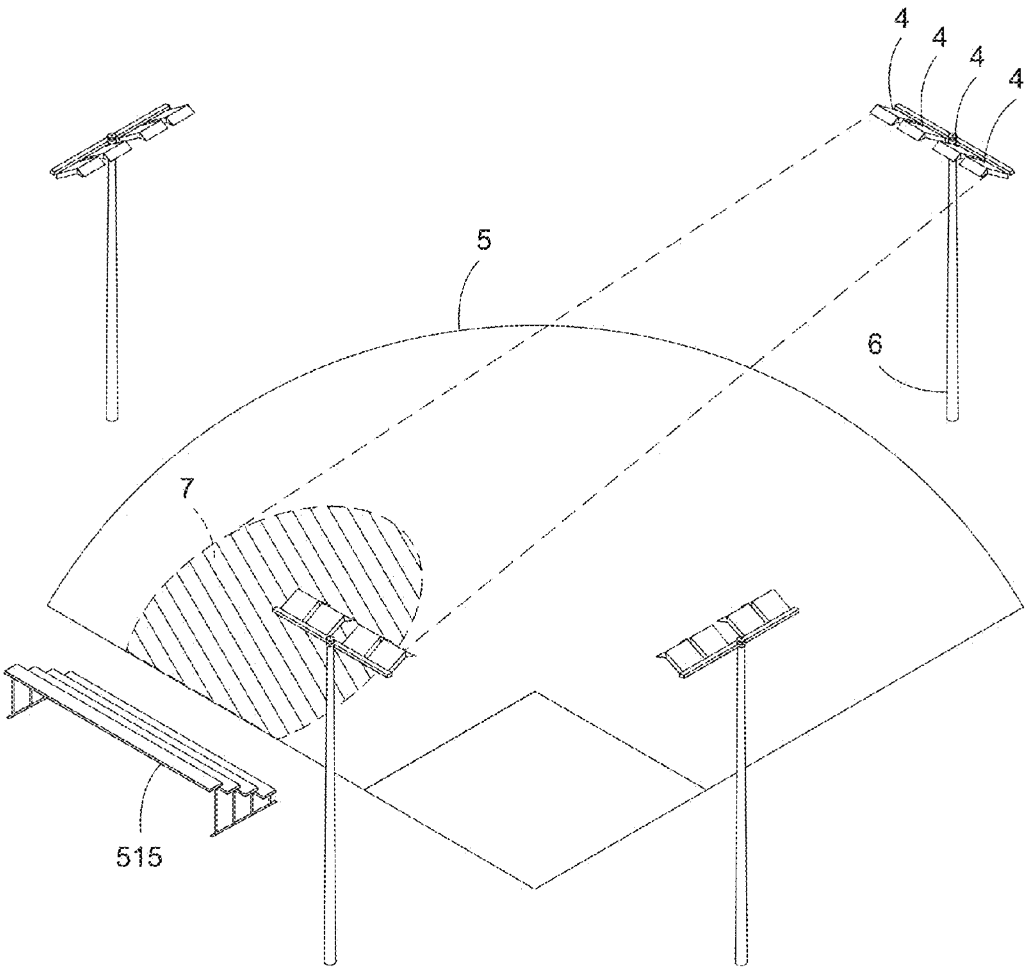

It is well known that to adequately illuminate a target area—particularly a target area of complex shape—a combination of light directing (e.g., aiming, collimating) and light redirecting (e.g., blocking, reflecting) efforts are needed; see, for example, U.S. Pat. No. 7,458,700 incorporated by reference herein. This concept is generally illustrated in FIGS. 1A-C for the example of a sports field illuminated by a plurality of elevated floodlight-type fixtures. As can be seen from FIG. 1A, in the un-aimed state a fixture 4 illuminates some portion of target area 5 (which typically comprises not only the horizontal plane containing the sports field, but also a finite space above and about said field); this illumination is diagrammatically illustrated by composite projected beam 7 (i.e., a composite of individual outputs from plural fixtures 4) wherein the hatched portion of beam 7 is considered desirable. Adjusting fixtures 4 relative to pole 6 (i.e., directing light) aims composite beam 7 toward the leftmost portion of target area 5 as desired (see FIG. 1B) but also results in the lighting of undesired areas such as bleachers 515. This light, commonly referred to as spill light, is wasteful and a potential nuisance (e.g., to spectators in bleachers 515) or hazardous (e.g., to drivers on a road adjacent to target area 5). To adequately eliminate spill light, a visor or analogous device may be added to fixtures 4 (see FIG. 1C) to provide a desired cutoff—i.e., redirect light. Some visors, such as those disclosed in U.S. Pat. No. 7,789,540 incorporated by reference herein, are equipped with inner reflective surfaces so to both cut off light and redirect said light back onto target area 5 so it is not absorbed or otherwise wasted.

This general approach to lighting a target area has worked well for traditional lighting systems employing a single visor for a single, large light source with high, omnidirectional light output (e.g., 1000 watt high-intensity discharge (HID) lamps). More recently, this approach has been applied to a plurality of small lights sources with low, directional light output (e.g., many 1-10 watt LEDs) and found success—but only for some lighting applications.

There is movement in the art towards LEDs lighting for everything from general task lighting to more demanding applications such as wide area lighting. Compared to traditional light sources such as the aforementioned, LEDs have a higher efficacy (lumens/watt), longer life, are more compliant with environmental laws, and have greater options for color selection, to name a few benefits. Further, replacing a single traditional light source with a plurality of compact and amiable light sources provides the potential to create complex beam patterns from a limited number of fixtures since the light output from each LED can be precisely and independently directed and redirected; if, of course, that potential can be logically and economically realized.

While a host of LED lighting fixtures have been designed for downlight applications (i.e., lighting applications that direct light generally downward towards the base of a pole to which the LEDs are affixed)—see, for example, U.S. Pat. Nos. 7,771,087 and 8,342,709—pivot those fixtures about their connection point to a pole so to project light outward and away from the pole (i.e., a floodlighting application such as that illustrated in FIGS. 1A-C) and a problem becomes apparent; namely, glare. Because there is no external visor on LED fixtures such as the aforementioned, the LEDs are directly viewable and cause glare. One might add an external visor such as in FIG. 1C so to reduce glare, but then there is the concern of undesirable lighting effects such as shadowing and uneven illumination because the LEDs contained therein are each aimed and paired with an optic so to produce a fixed aiming angle and beam pattern—and are not designed to cooperate with a single external visor.

Further, when adding an external visor to provide glare control for an outdoor lighting application such as that illustrated in FIGS. 1A-C, one must consider how the visor affects the fixture's effective projected area (EPA). An increased EPA may require a more substantial pole or more robust means of affixing the fixture to the pole so to address increased wind loading, which may add cost. Given that a typical wide area or sports lighting application utilizes multiple poles with many fixtures per pole—see, for example, aforementioned U.S. Pat. No. 7,458,700—the added cost from even a slight change to EPA can be substantial. Thus, attempting to modify an existing LED downlight fixture to produce an LED floodlight fixture which is suitable for a sports lighting application may not be economically feasible.

Accordingly, there is a need in the art for a design of lighting fixture which can realize the benefits of multiple small light sources such as LEDs (e.g., long life, high efficacy, ability to aim to multiple points, greater flexibility in creating lighting uniformity, etc.) while preserving desirable features of a lighting fixture (e.g., low EPA, high coefficient of utilization, suitability for outdoor use, etc.) in a manner that addresses the lighting needs of a demanding application (e.g., wide area, sports lighting, and the like) while avoiding the undesirable lighting effects (e.g., uneven illumination, shadowing effects, glare, etc.) evident when simply modifying existing LED lighting fixtures.

II. SUMMARY OF THE INVENTION

Envisioned is a compact lighting fixture designed to accommodate a plurality of adjustable light sources, and apparatus, systems, and methods for independent but cooperative light directing and light redirecting thereof such that a complex target area may be adequately illuminated with increased glare control, reduced EPA, and increased lighting uniformity as compared to at least most conventional floodlight-type fixtures for sports lighting applications.

It is therefore a principle object, feature, advantage, or aspect of the present invention to improve over the state of the art and/or address problems, issues, or deficiencies in the art.

According to one aspect of the present invention, a plurality of light sources—each with associated optical elements—is pivotable about a first axis so to provide light directing means. One or more visors (each of which is associated with one or more light sources) are pivotable about the same axis as the light sources but independently pivotable so to provide independent but cooperative light redirecting means.

According to another aspect of the present invention, a secondary visor external to a housing containing one or more light sources is pivotable about an axis such that the axis interposes one or more internal visors and the external visor so to provide additional independent but cooperative light redirecting means without adversely affecting the size or EPA of the fixture. If desired, the one or more internal visors and the one or more light sources may be mounted at fixed angles or pivotable about said axis or a different axis.

According to another aspect of the present invention, one or more additional pivot axes are available via fixture structure, associated armature, optical elements, or supporting structure so to optimize light directing means.

According to yet another aspect of the present invention, the aforementioned light sources each comprise a plurality of LEDs such that multiple LEDs share a single optical element so to maximize light output without incurring the cost of additional optical elements, the burden of undesirable lighting effects from directing/redirecting light from multiple LEDs aimed in multiple directions, or the detriment of running a single LED at higher current (resulting in a well-known decrease in life span, efficacy, and sometimes perceived color).

According to another aspect of the present invention, techniques are provided whereby the aforementioned light directing and redirecting means can be determined for a lighting application prior to the installation of lighting fixtures at a site such that, for any given fixture, the desired aiming angle of LEDs, number of LEDs, type of optical element, number of LEDs sharing an optical element, aiming angle of secondary visor, etc. may be preset at the manufacturer so to provide a more reliable onsite product that requires no additional modification to produce, for example, a desired composite beam pattern or degree of glare control.

These and other objects, features, advantages, or aspects of the present invention will become more apparent with reference to the accompanying specification and claims.

III. BRIEF DESCRIPTION OF THE DRAWINGS

From time-to-time in this description reference will be taken to the drawings which are identified by figure number and are summarized below.

FIGS. 1A-C diagrammatically illustrate the general process by which a target area is illuminated by a lighting fixture. FIG. 1A illustrates an un-aimed lighting fixture, FIG. 1B illustrates the fixture from FIG. 1A aimed, and FIG. 1C illustrates the fixture from FIG. 1A aimed and with cutoff.

Figure 2A:
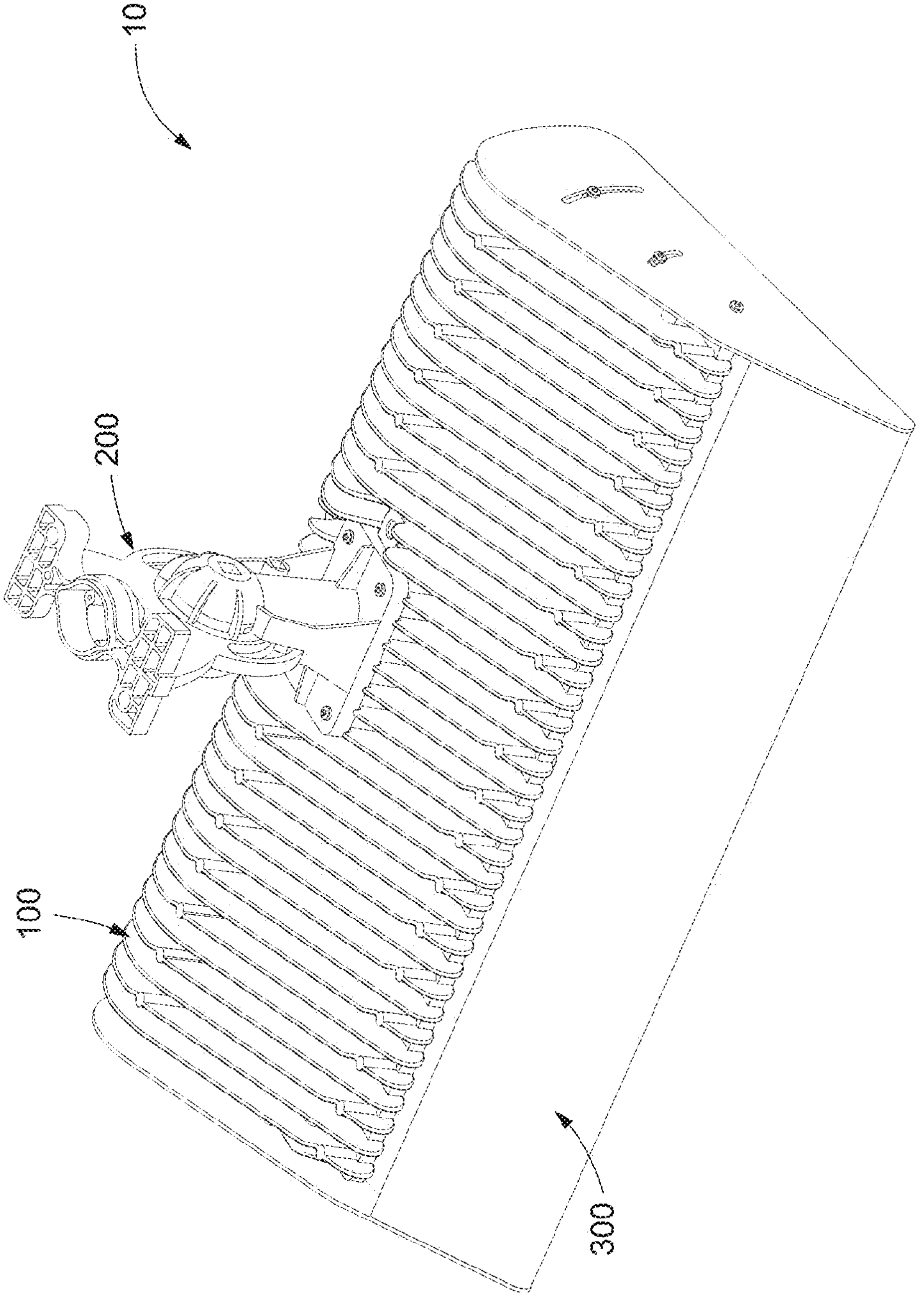
Figure 2B:
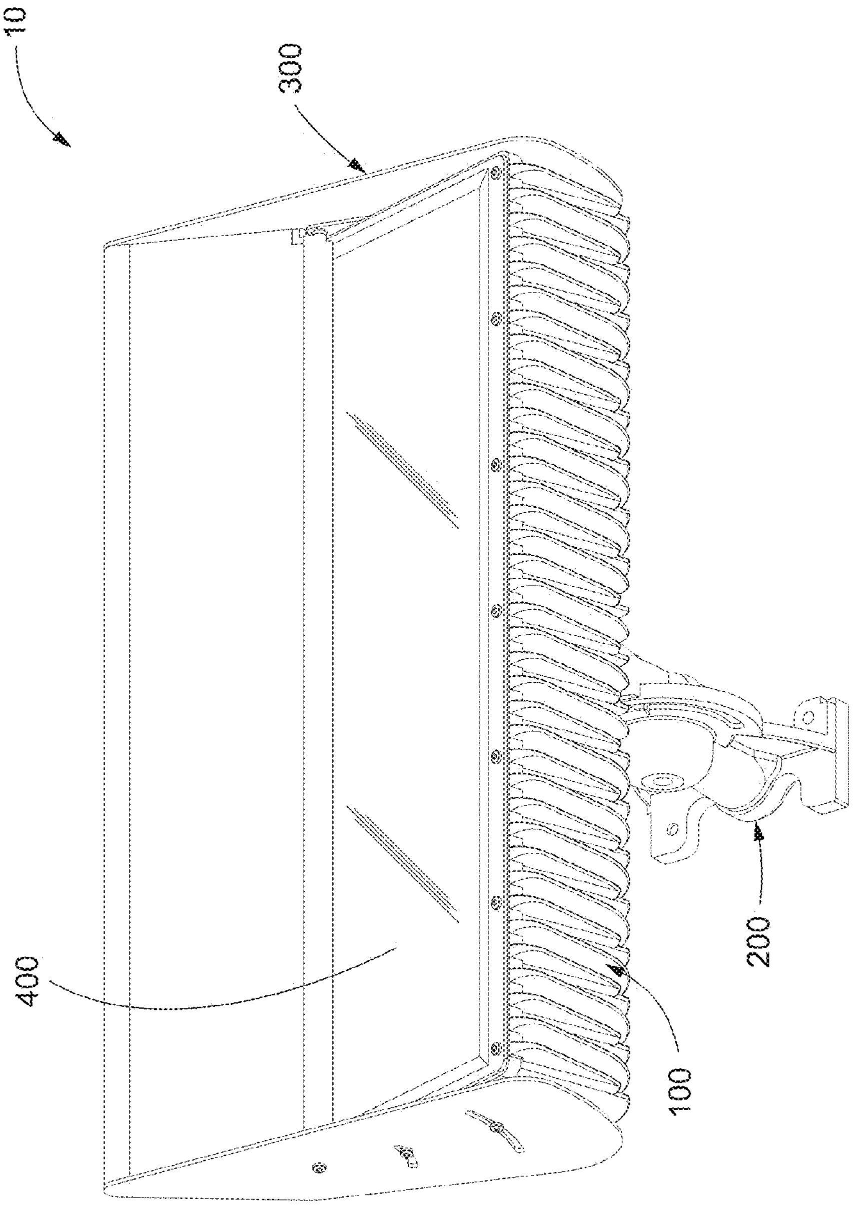
Figure 2C:
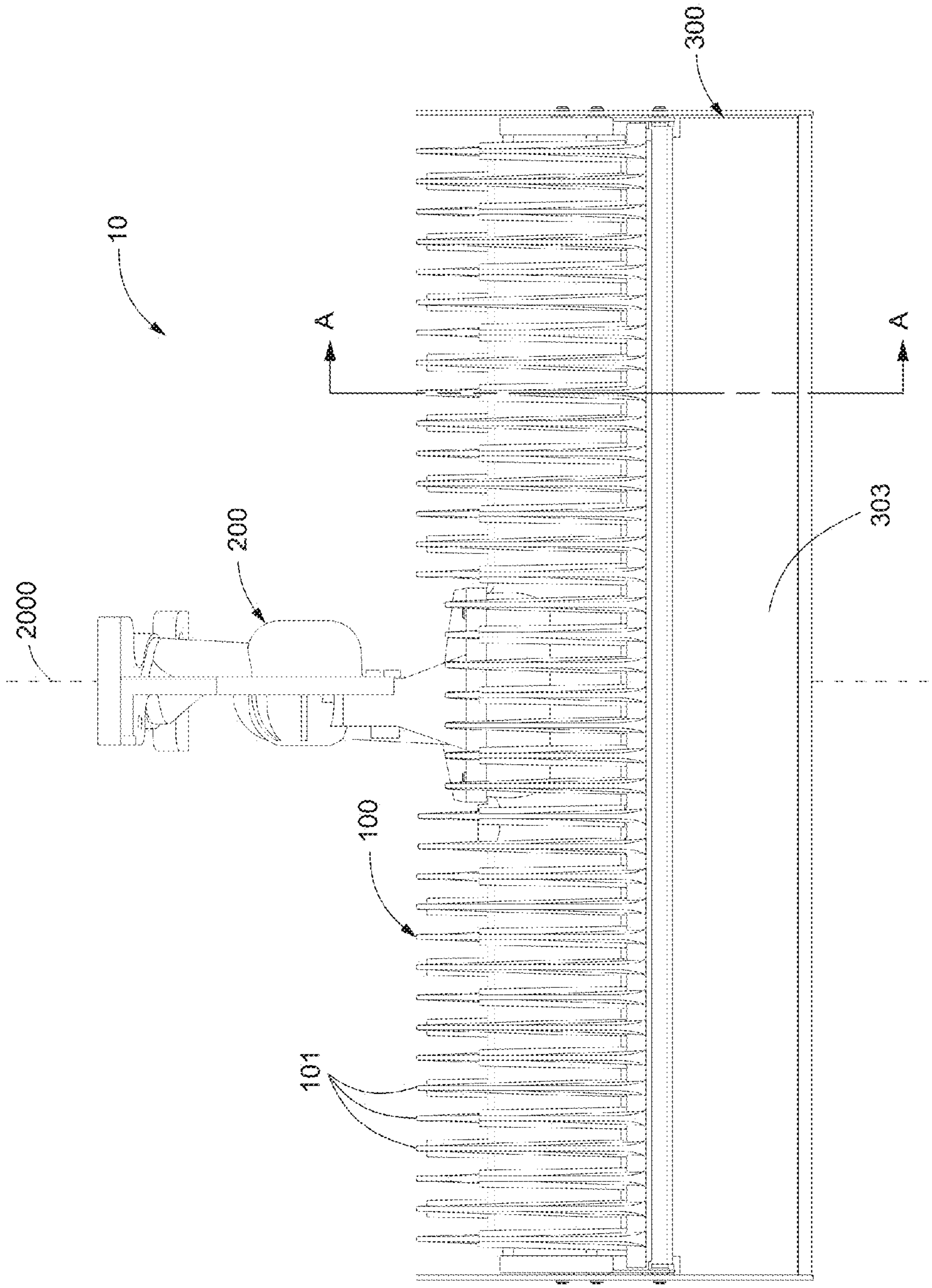
Figure 2D:
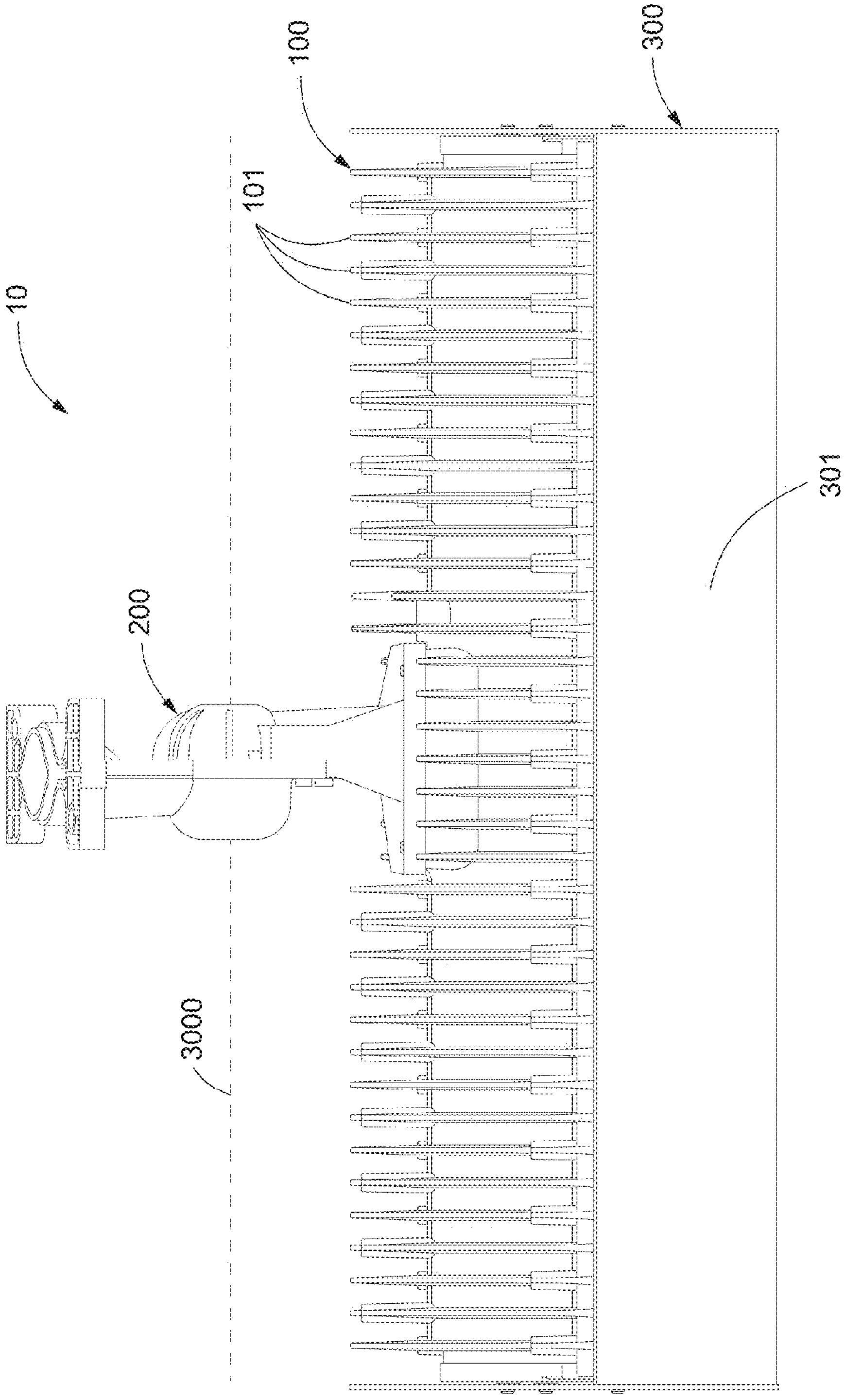
Figure 2E:
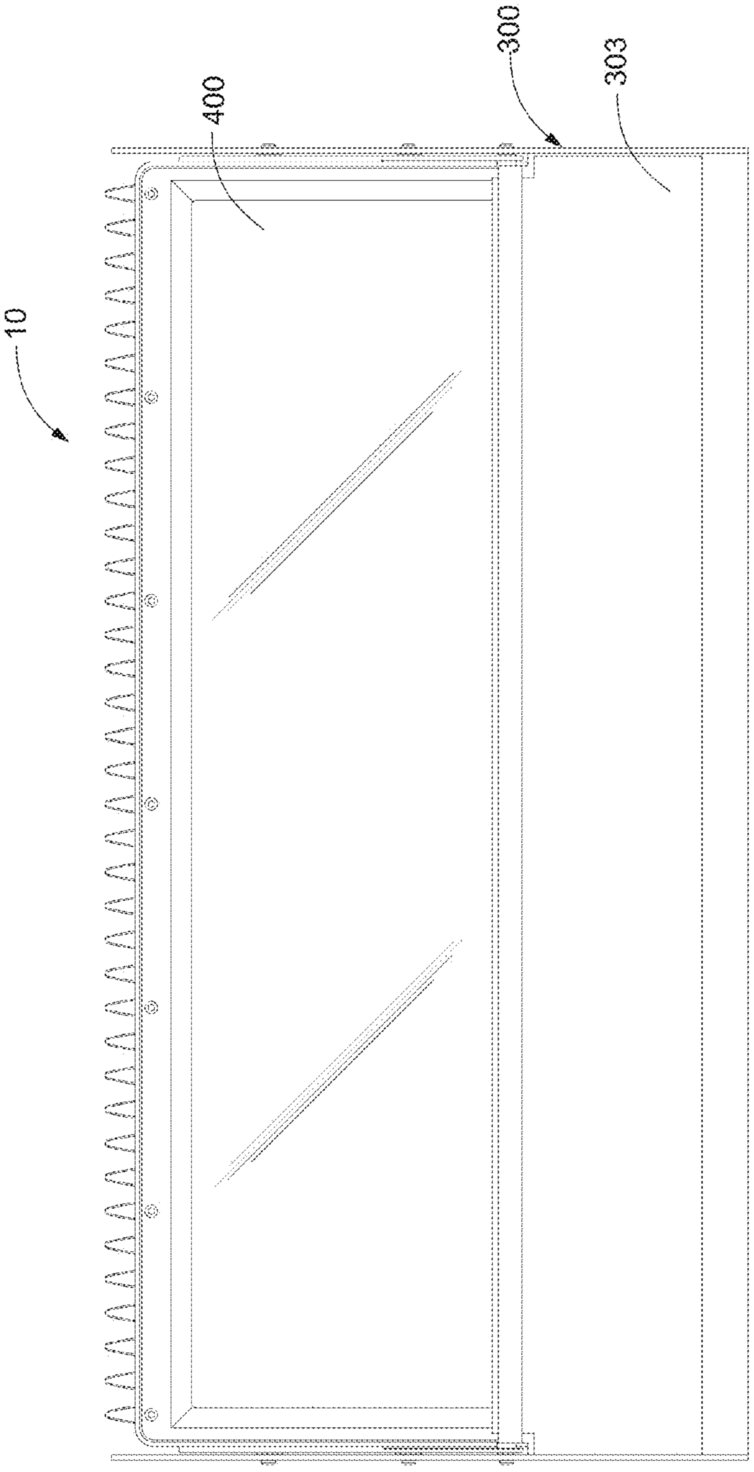
Figure 2F:
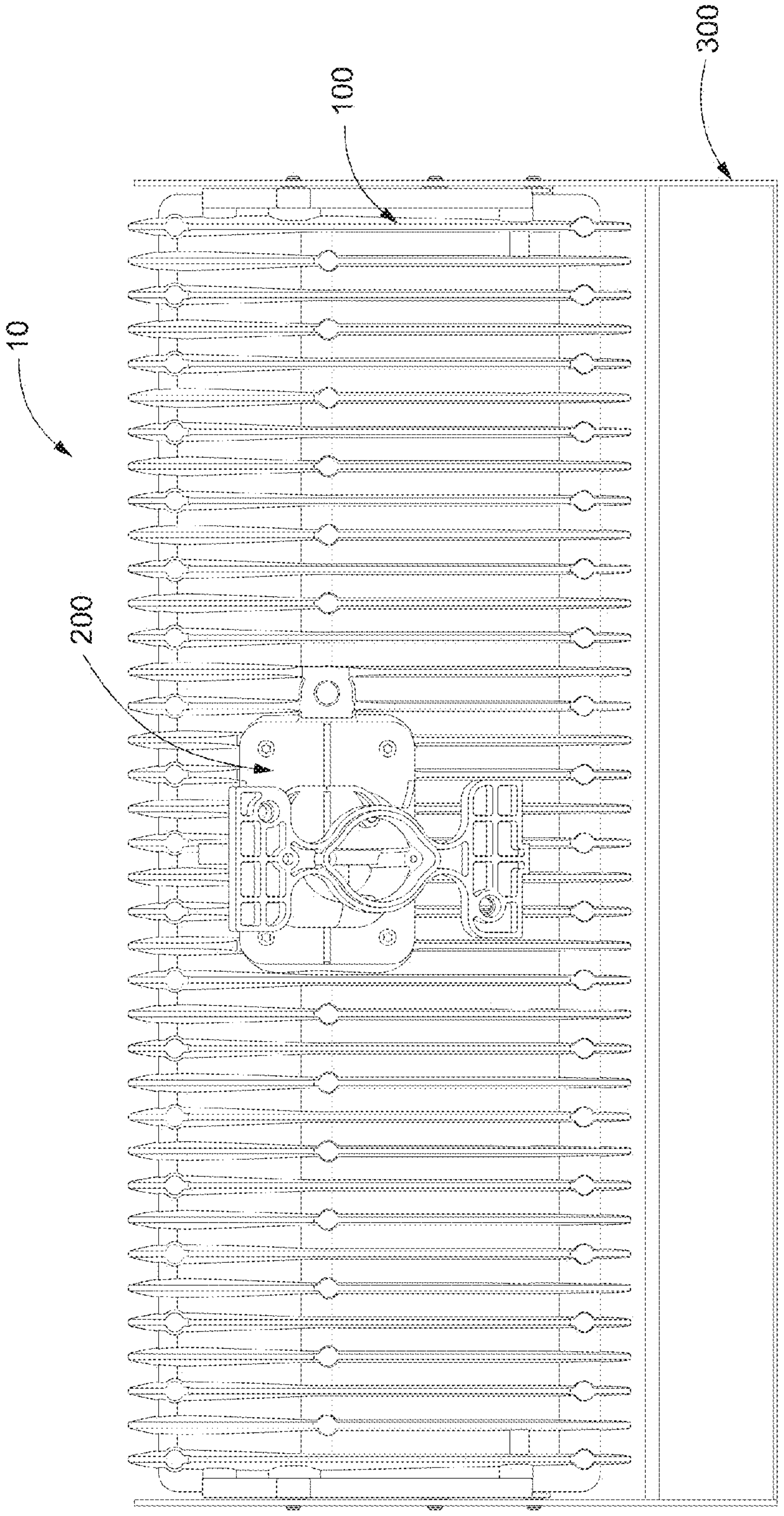
Figure 2G:
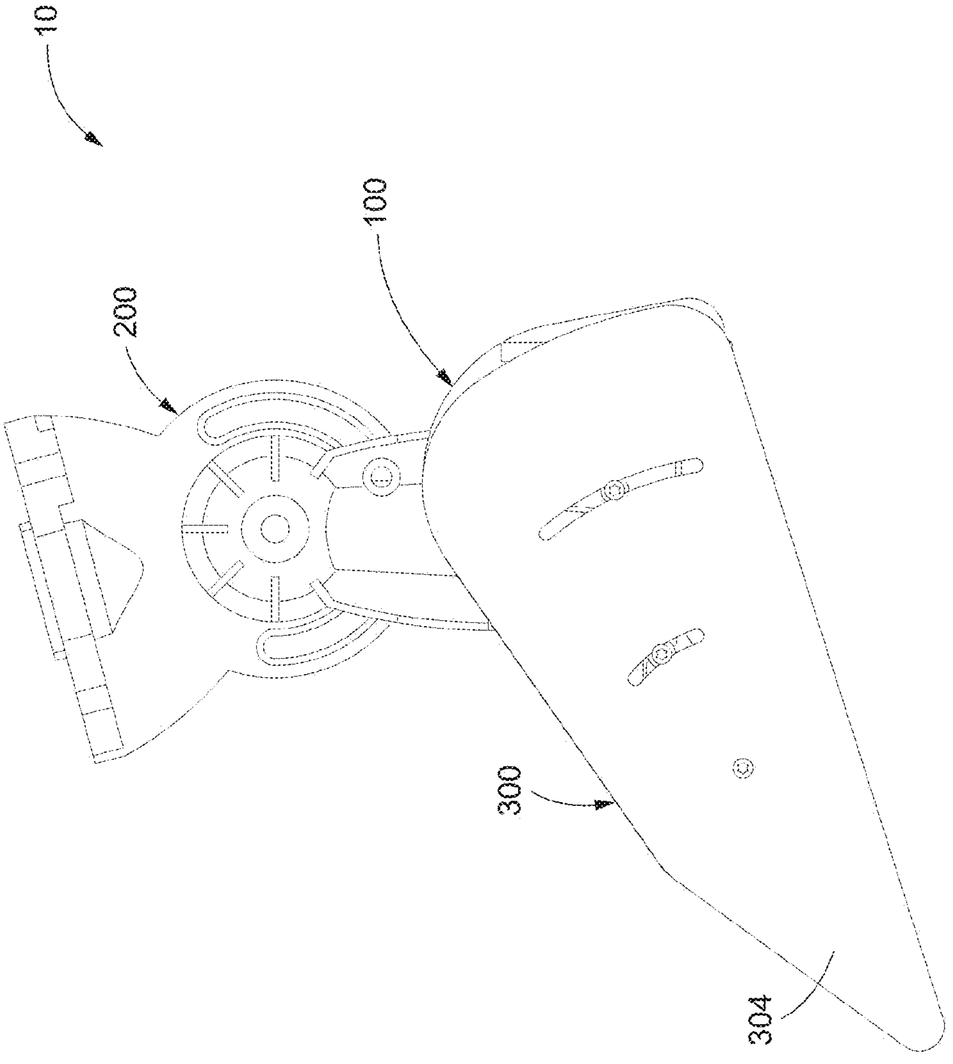
Figure 2H:
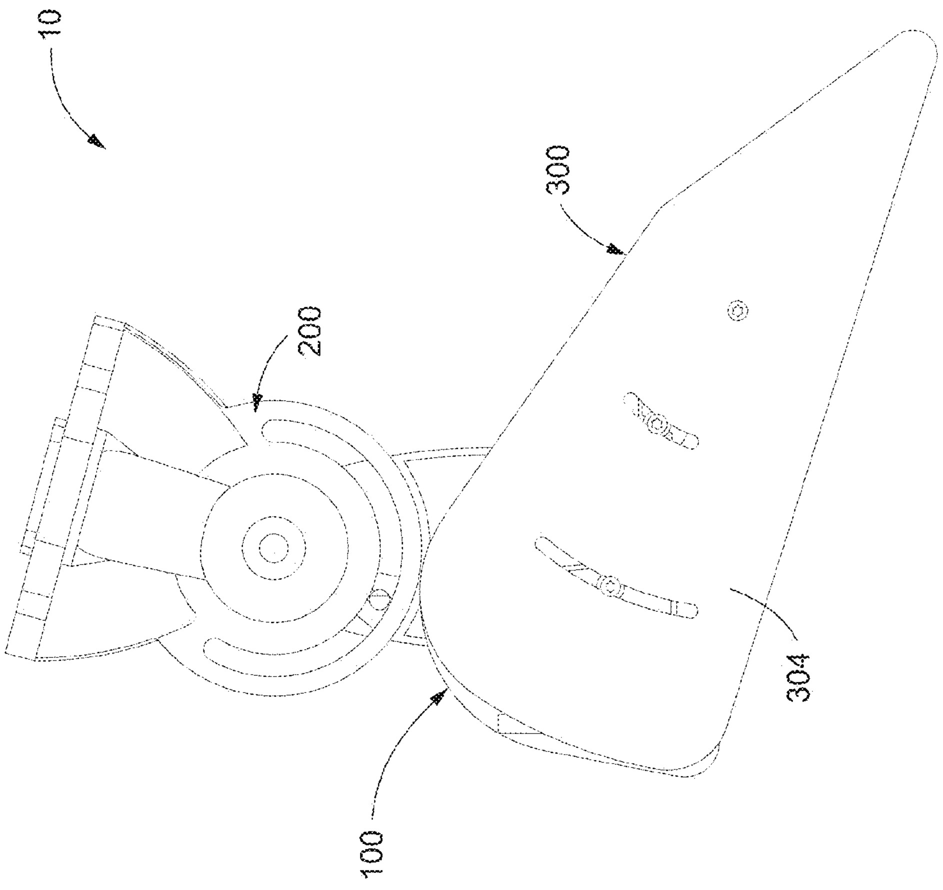

FIGS. 2A-H illustrate multiple views of a lighting fixture according to a first embodiment of a present invention. FIGS. 2A and B illustrate perspective views, FIG. 2C illustrates a back view, FIG. 2D illustrates a front view, FIG. 2E illustrates a bottom view, FIG. 2F illustrates a top view, and FIGS. 2G and H illustrate opposing side views.

Figure 3A:
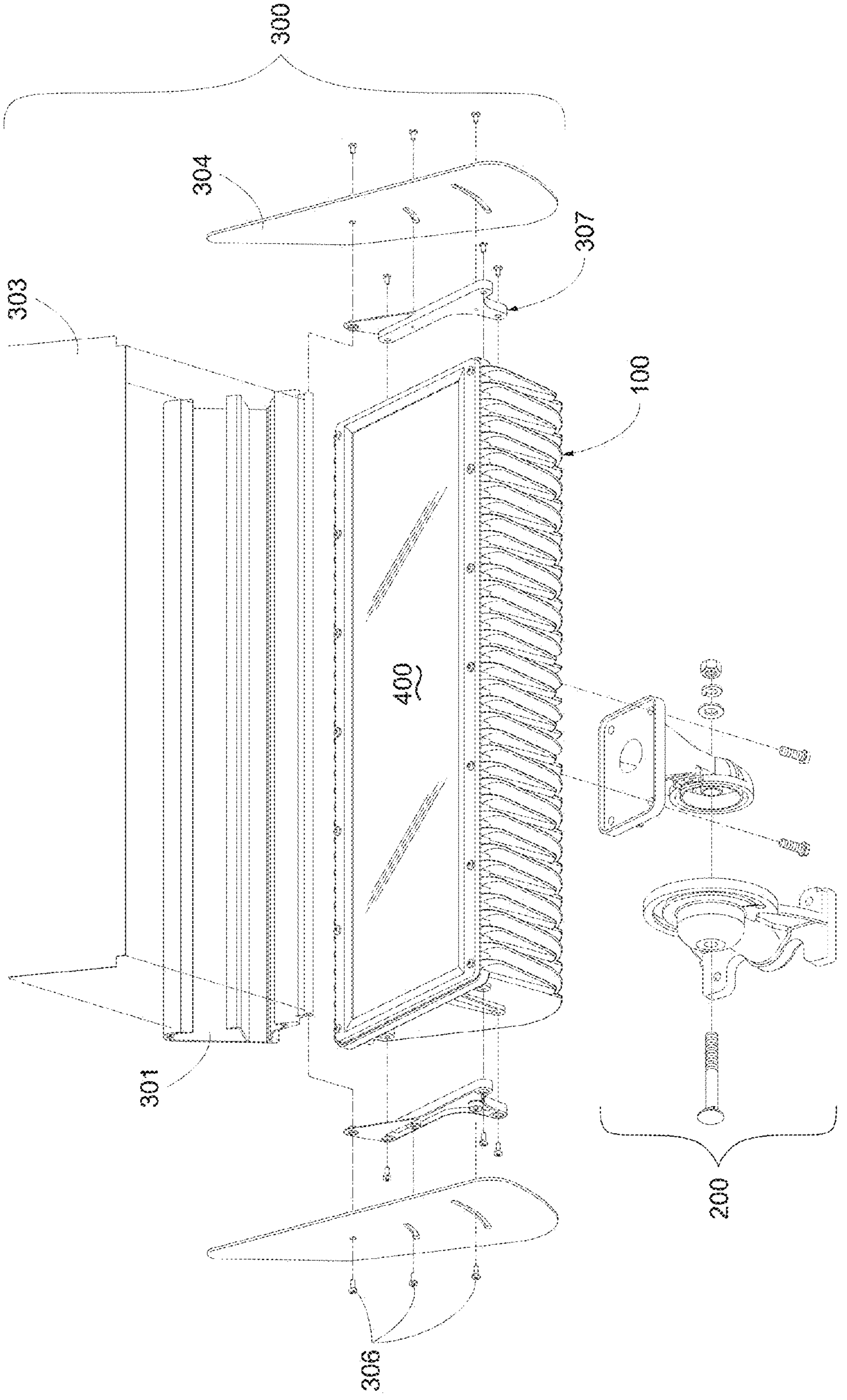
Figure 3B:
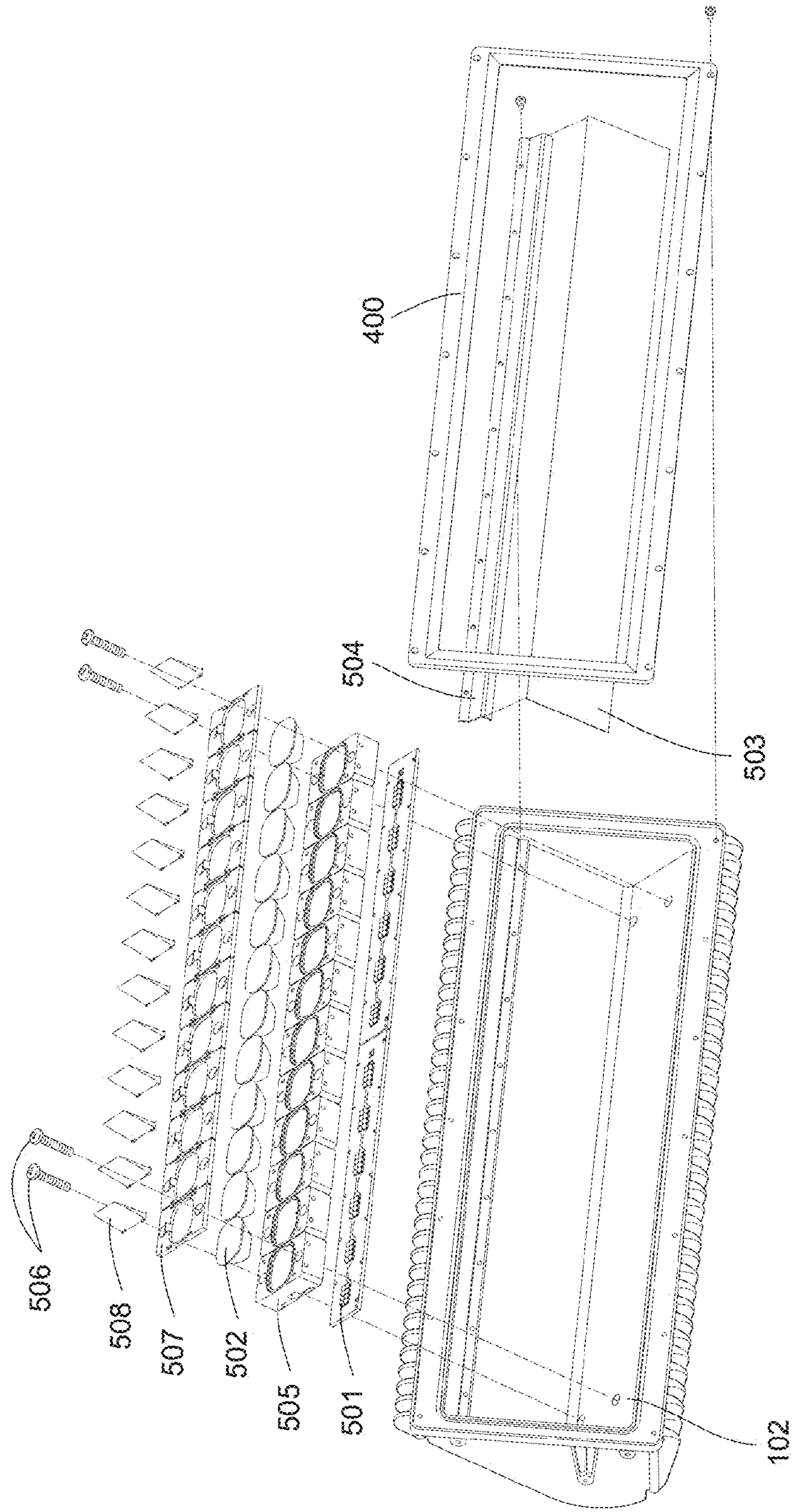

FIGS. 3A and B illustrate partially exploded perspective views of the lighting fixture of FIGS. 2A-H. FIG. 3A illustrates the fixture with knuckle 200 and external pivot visor 300 exploded only and FIG. 3B illustrates the fixture with knuckle 200 and external pivot visor 300 omitted (for clarity) and the remaining fixture components exploded; note FIG. 3B also omits several fastening devices (for clarity).

Figure 4A:
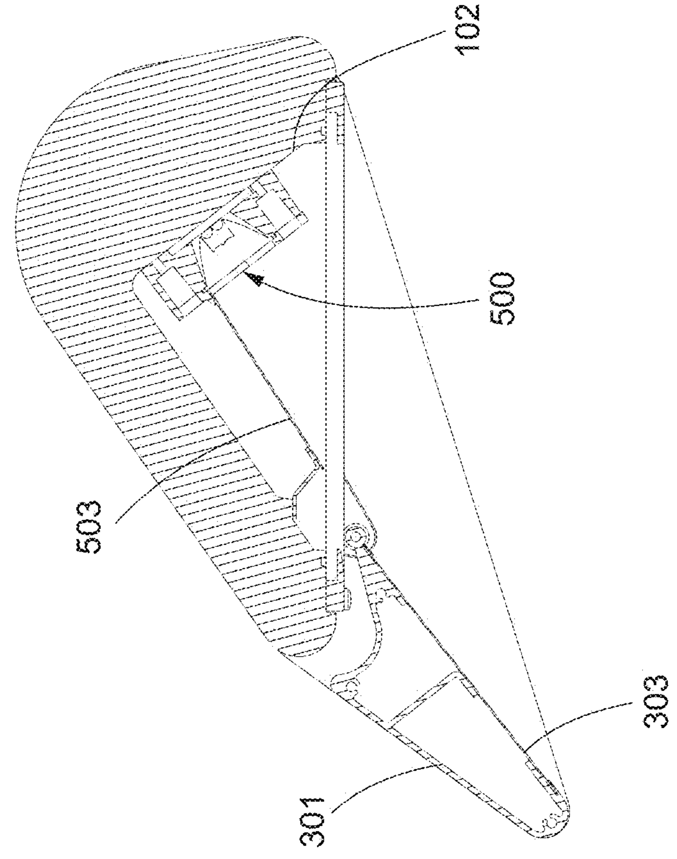
Figure 4B:
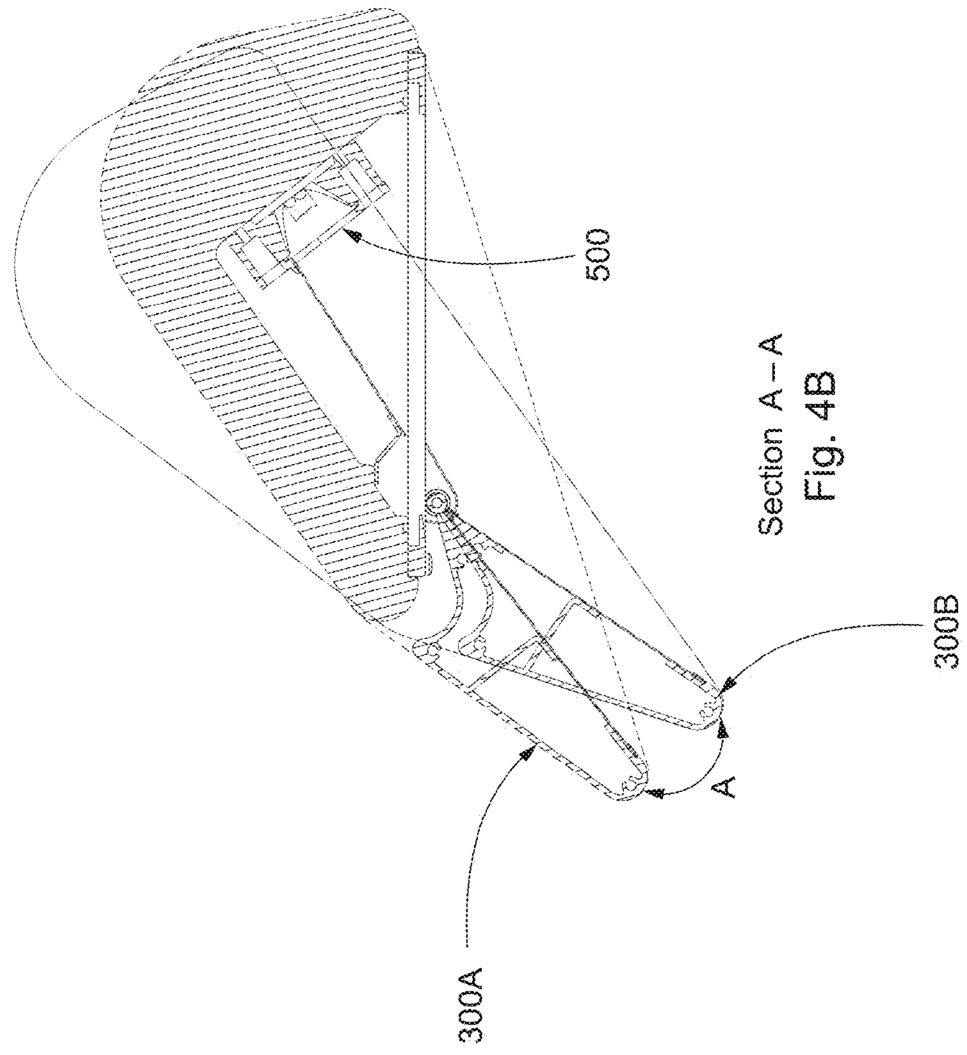
Figure 4C:
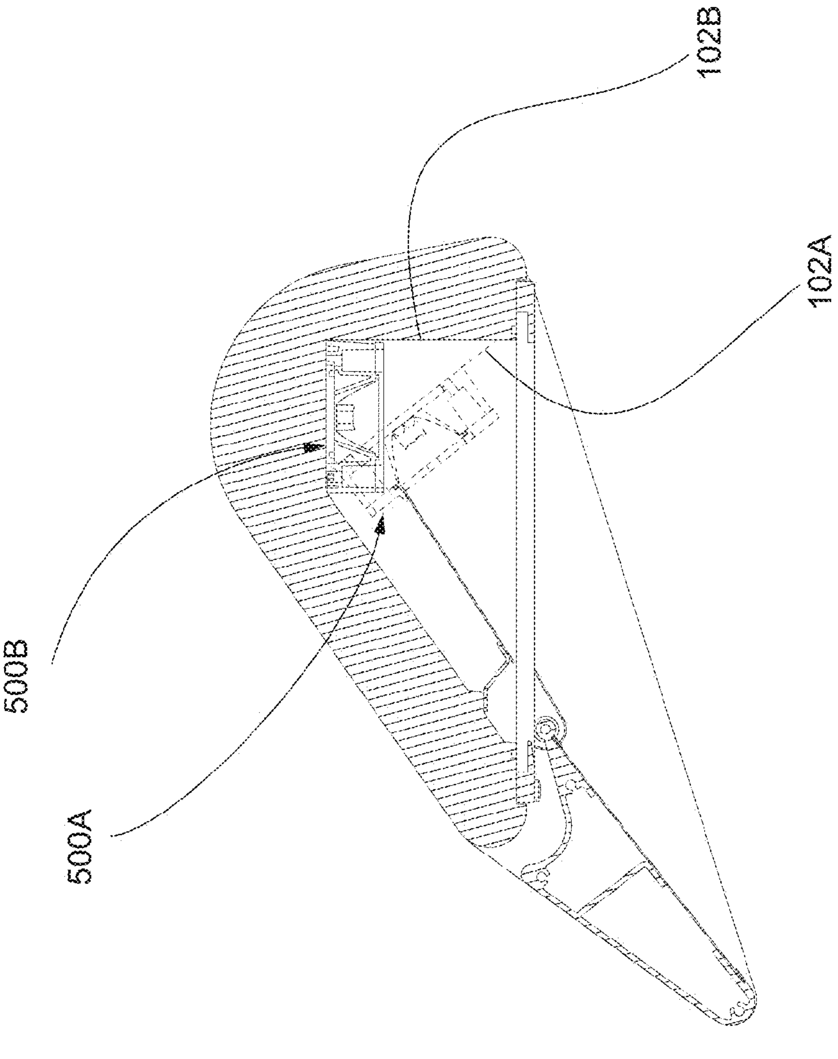
Figure 4D:
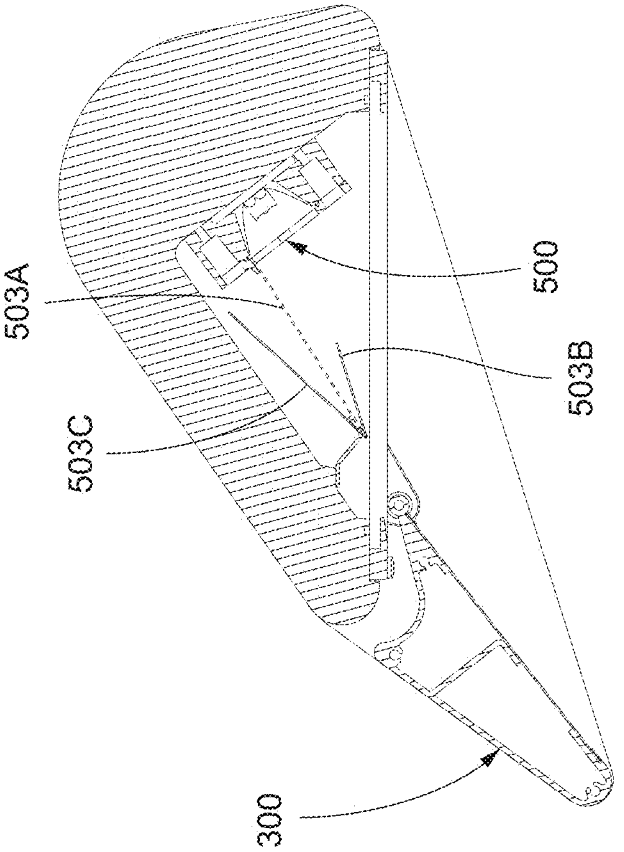
Figure 4E:
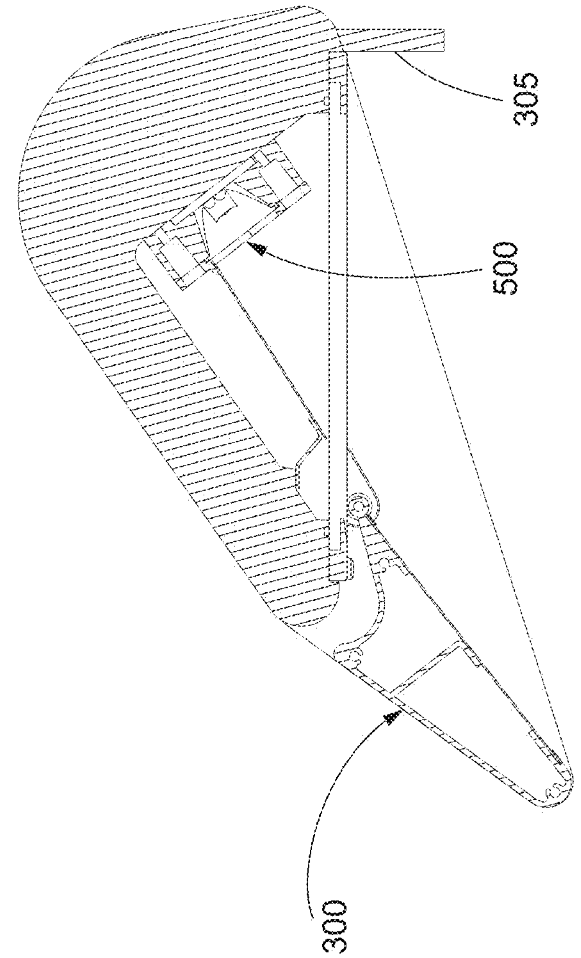

FIGS. 4A-E illustrate a section view of the fixture of FIGS. 2A-H along line A-A of FIG. 2C. FIG. 4A illustrates the basic section view; note optional insert 508 has been omitted. FIG. 4B illustrates the section view of FIG. 4A showing different pivoting positions of visor 300 (see 300A and 300B). FIG. 4C illustrates the section view of FIG. 4A showing different mounting surfaces 102*a* and 102*b*. FIG. 4D illustrates the section view of FIG. 4A showing different aiming angles of interior visor 503 (see 503A-C). FIG. 4E illustrates the section view of FIG. 4A with the addition of an optional reflective component 305.

Figure 5A:
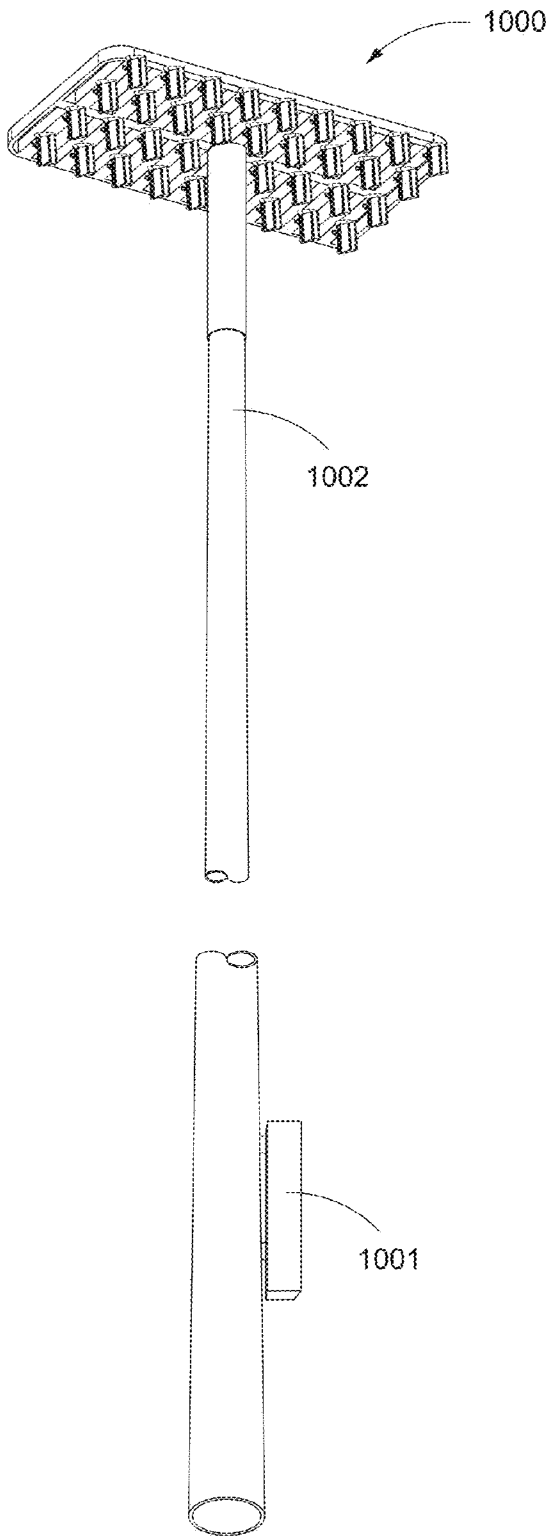
Figure 5B:
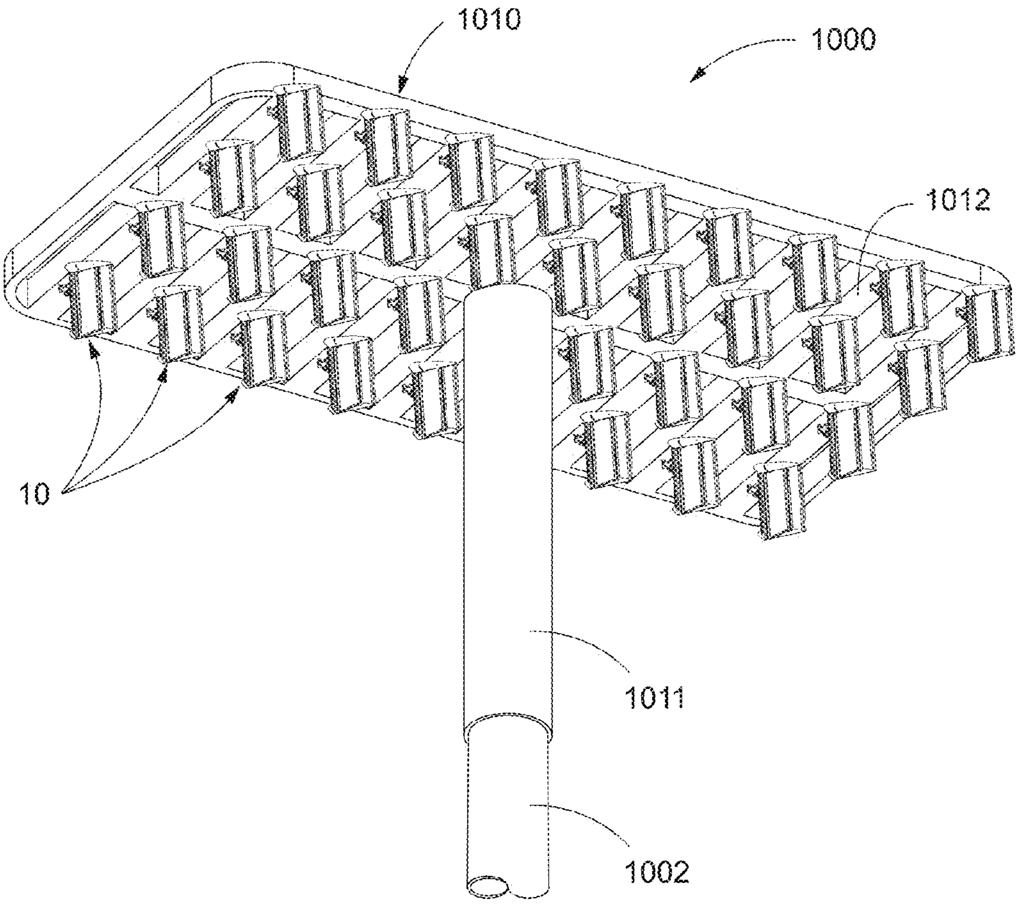

FIGS. 5A and B illustrate one possible pole and lighting fixture array combination according to aspects of the present invention; FIG. 5B is an enlarged view of the top portion of the perspective view of FIG. 5A.

Figure 6:
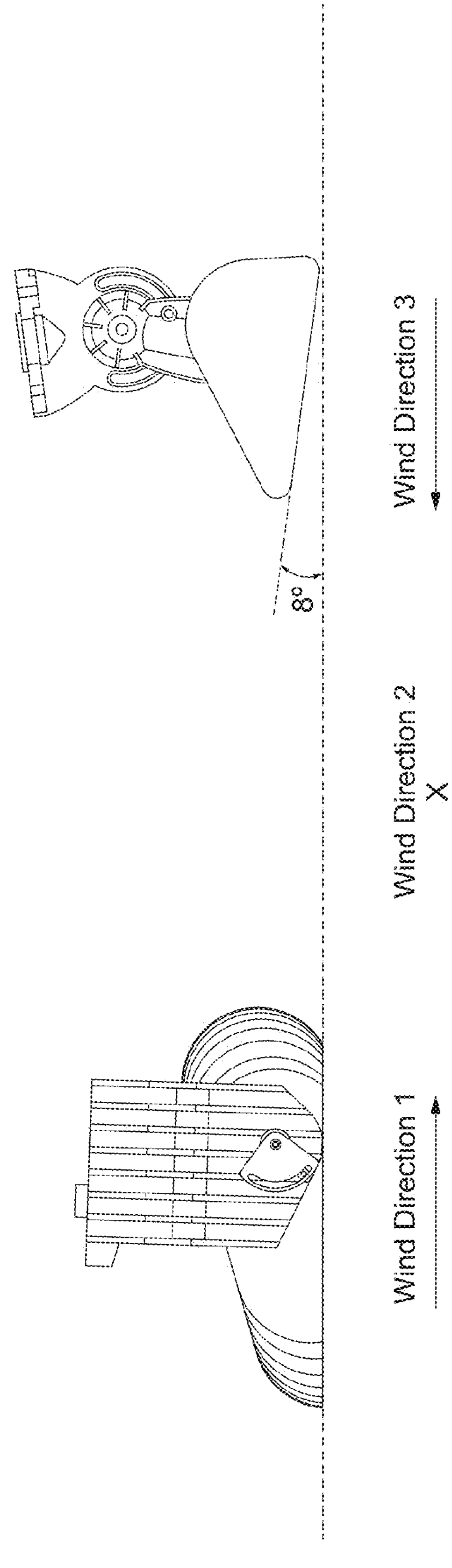

FIG. 6 diagrammatically illustrates wind direction in accordance with wind load testing of a fixture according to a second embodiment (left) and a first embodiment (right) of the present invention.

Figure 7:
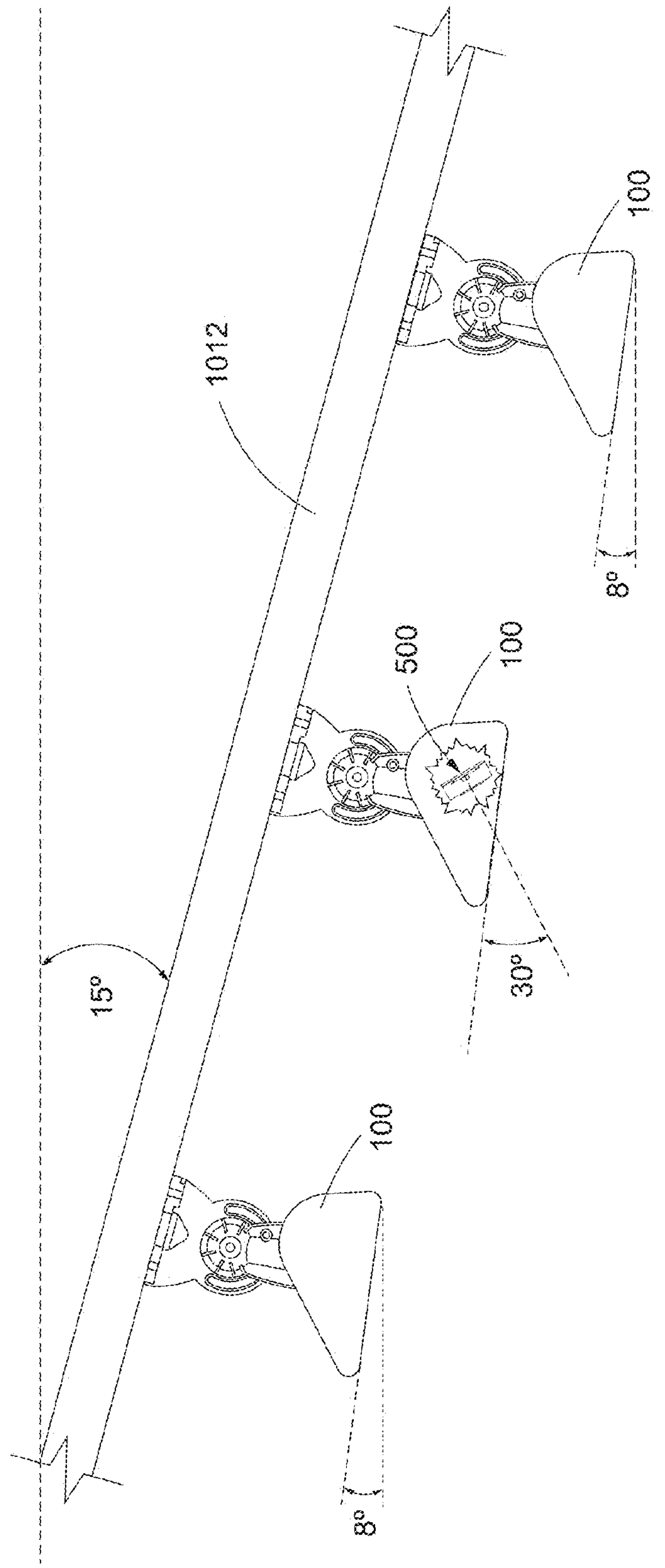

FIG. 7 illustrates various aiming angles in accordance with wind load testing of an array of fixtures according to a first embodiment of the present invention.

Figure 8A:
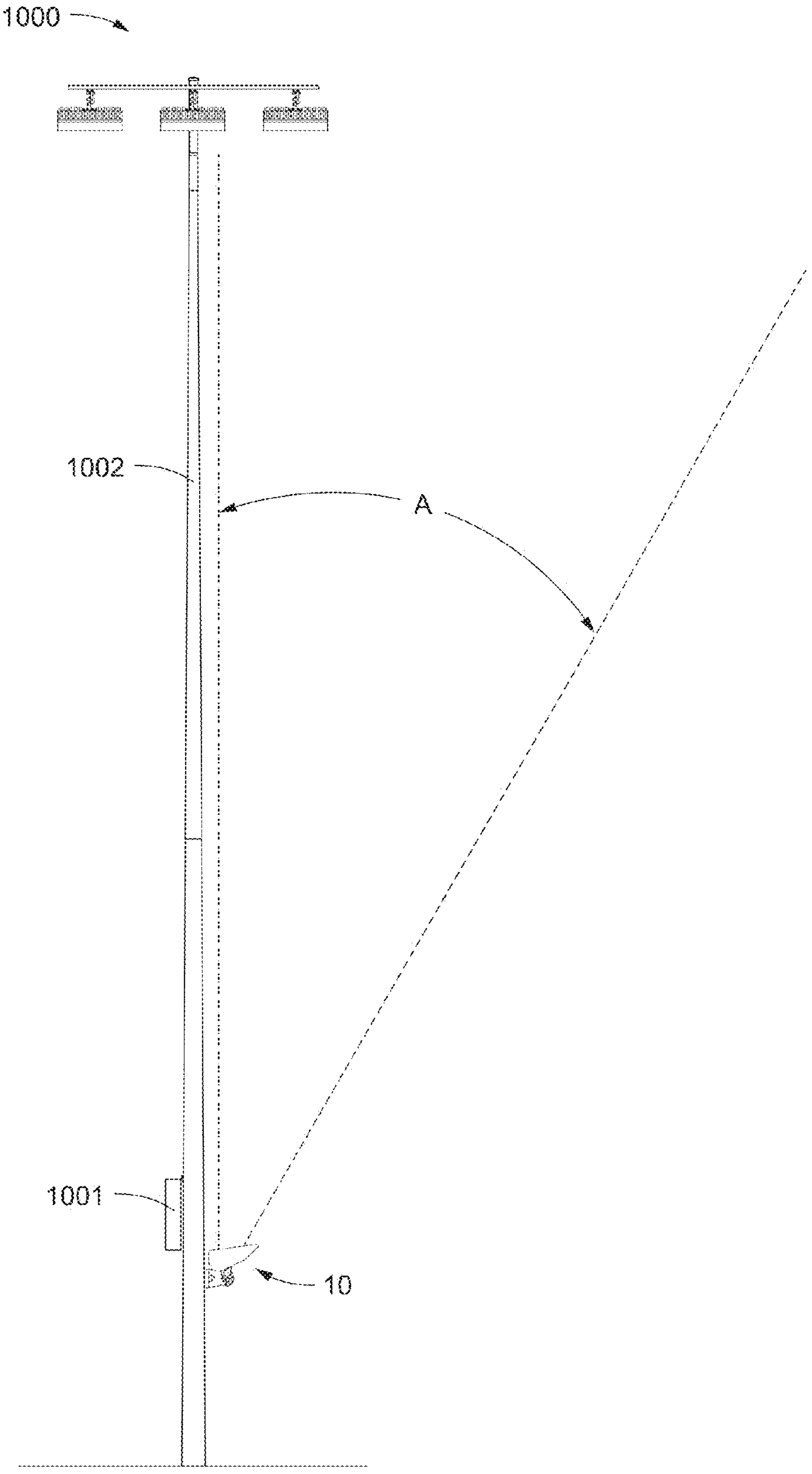
Figure 8B:
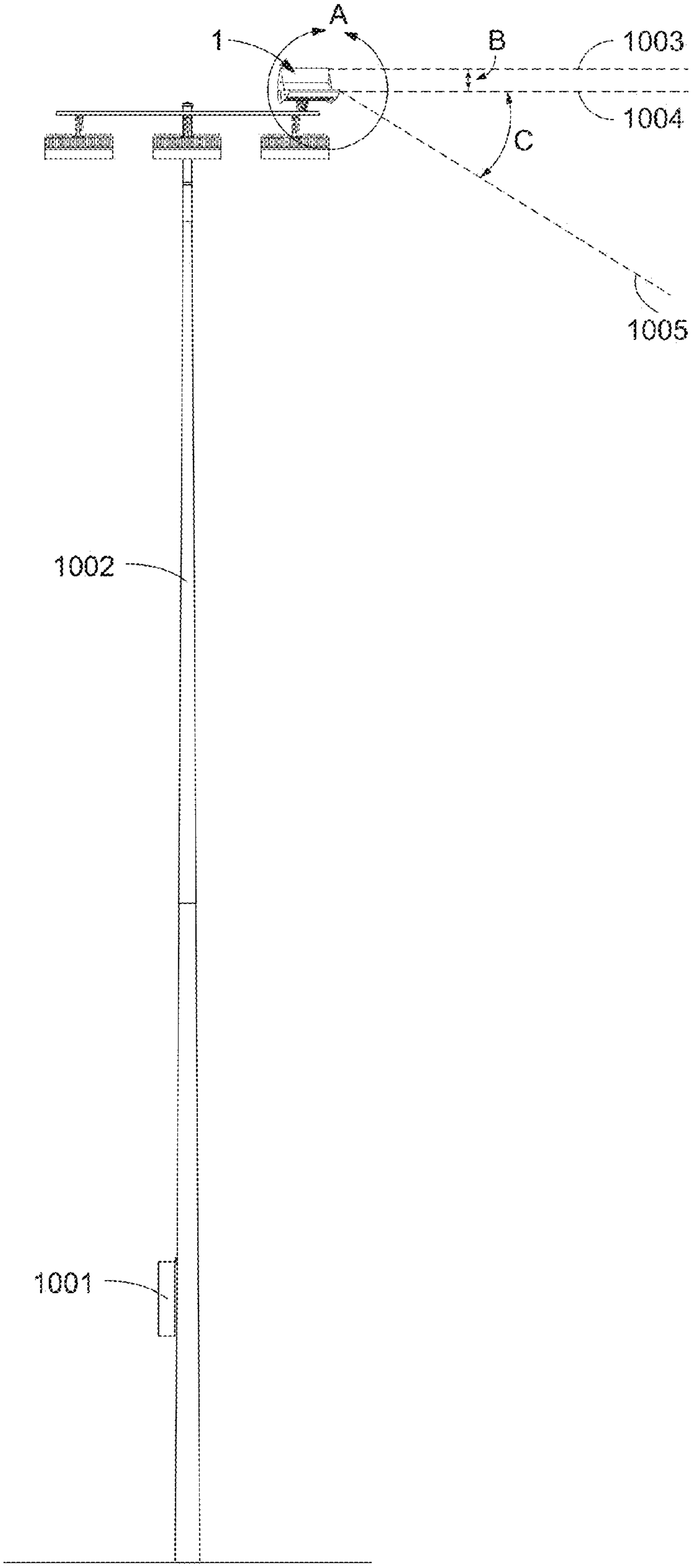
Figure 8C:
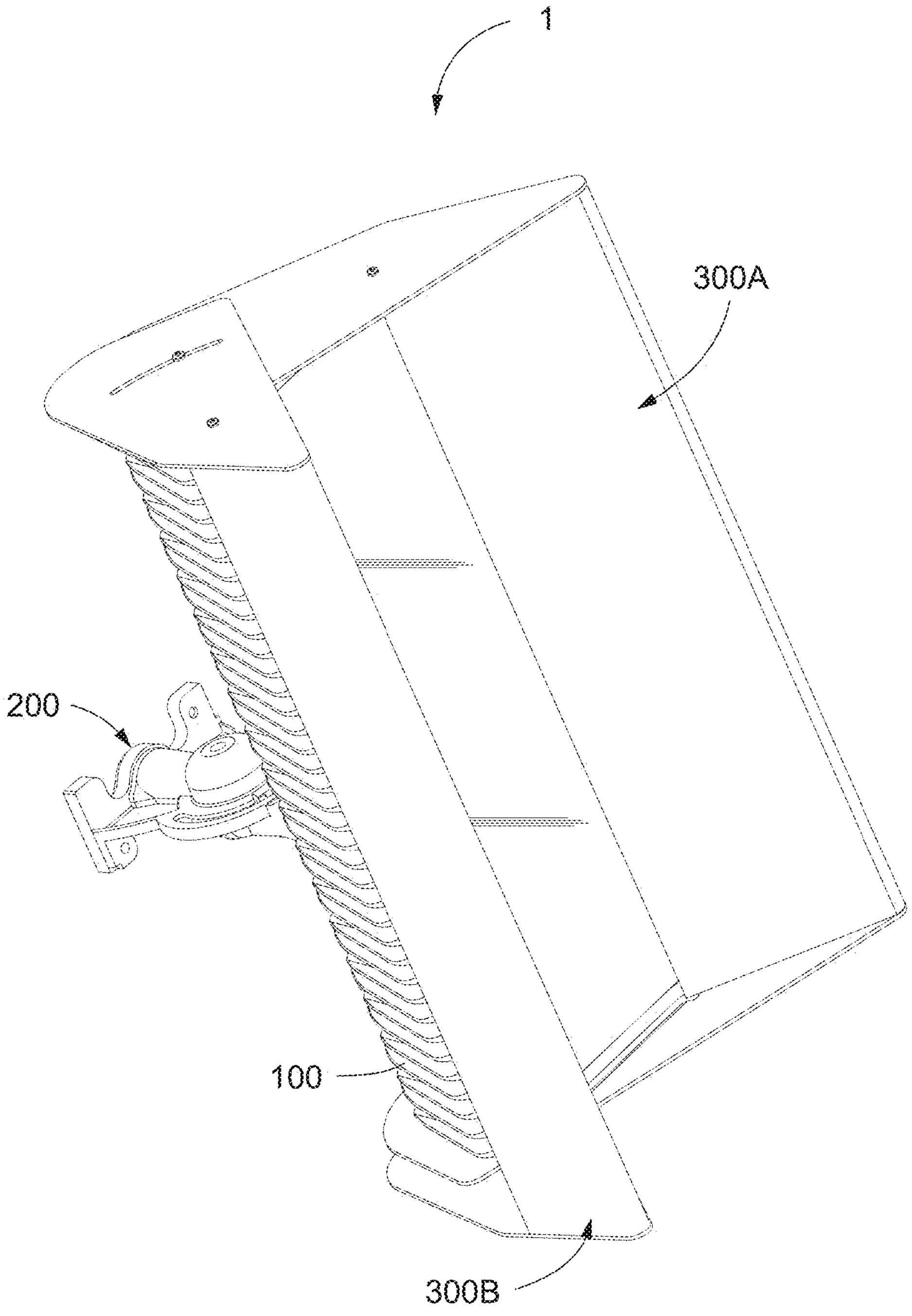

FIGS. 8A-C illustrate two possible options for uplighting using the fixture of FIGS. 2A-H. FIG. 8A illustrates the fixture mounted low on a pole and upside down. FIGS. 8B and C illustrate the fixture mounted high on a pole within an array and with an additional external pivot visor 300 (see 300A and 300B). FIG. 8C is an enlarged view of detail A of FIG. 8B.

Figure 9:
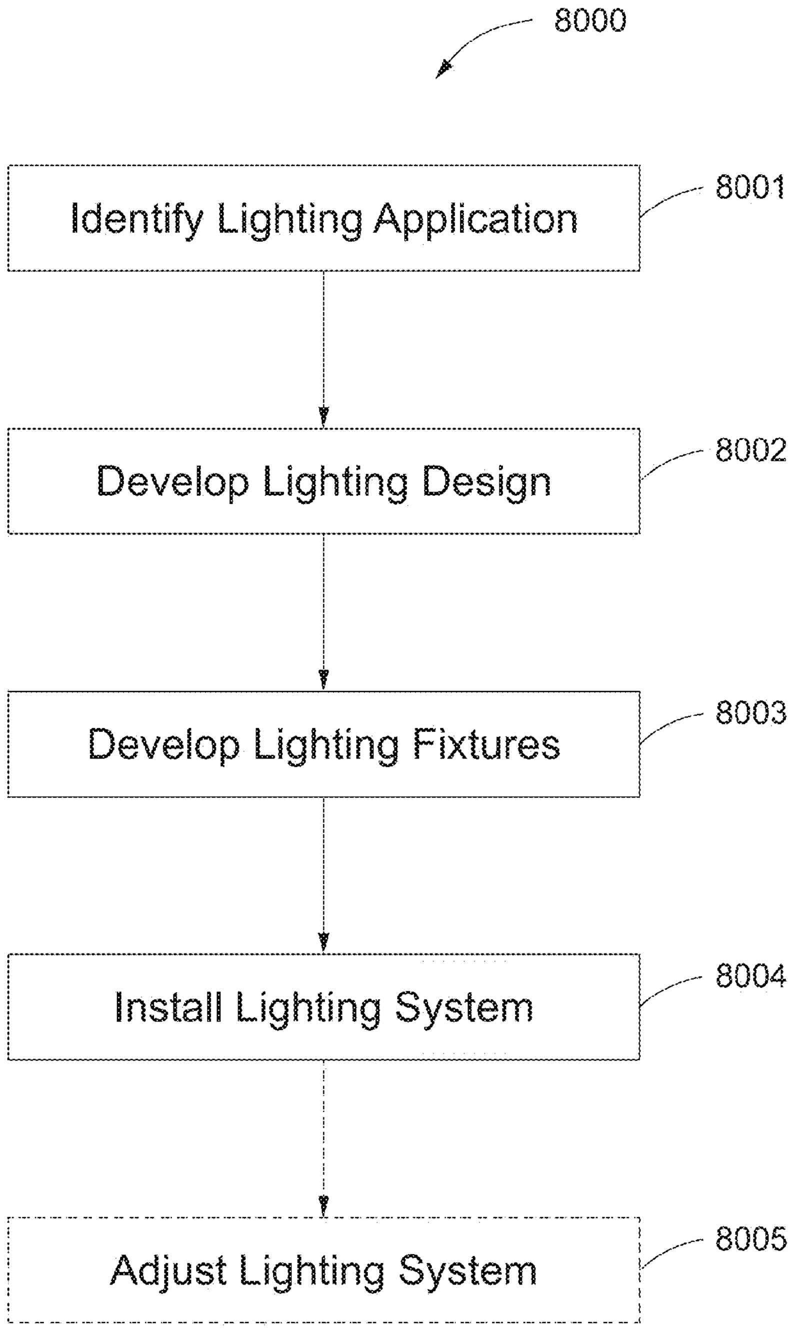

FIG. 9 illustrates in flowchart form one possible method of addressing the lighting needs of a particular lighting application according to aspects of the present invention.

IV. DETAILED DESCRIPTION OF EXEMPLARY EMBODIMENTS

A. Overview

To further an understanding of the present invention, specific exemplary embodiments according to the present invention will be described in detail. Frequent mention will be made in this description to the drawings. Reference numbers will be used to indicate certain parts in the drawings. The same reference numbers will be used to indicate the same parts throughout the drawings.

Specific exemplary embodiments make reference to floodlight-type fixtures for sports lighting applications; this is by way of example and not by way of limitation. For example, other wide area lighting applications which—compared to sports lighting applications—typically require a lower overall light level (e.g., 3 horizontal footcandles (fc) versus 50 horizontal fc), lower lighting uniformity (e.g., 10:1 max/min versus 2:1 max/min), and reduced setback (e.g., several feet versus tens of feet), may still benefit from at least some aspects according to the present invention. As another example, downlight-type fixtures may still benefit from at least some aspects according to the present invention. As yet another example, floodlight-type fixtures which are not elevated and used for sports lighting (e.g., ground mounted floodlight-type fixtures used for façade lighting) may still benefit from at least some aspects according to the present invention.

Regarding terminology, it is to be understood that the term "light directing" is intended to refer to systems, apparatus, methods, means, and techniques by which light is transmitted along a defined direction. This can be achieved in a variety of ways including but not limited to via lenses, filters, pivoting of one or more components of the fixture or other structural members of the lighting system, and so on. Likewise, the term "light redirecting" is intended to refer to systems, apparatus, methods, means, and techniques by which the defined direction of light is somehow modified. This can be achieved in a variety of ways including but not limited to via reflectors, visors, light absorbing members, diffusers, and so on. The various optical elements and other components described herein are only examples of light directing and light redirecting means; others are possible, and envisioned, and include elements or components which provide both light directing and light redirecting means.

B. Exemplary Method and Apparatus Embodiment 1

A more specific exemplary embodiment, utilizing aspects of the generalized example described above, will now be described. FIGS. 2A-H illustrate various views of a first envisioned lighting fixture 10 generally comprising a wedge-shaped housing 100 to aid in producing a low EPA with a plurality of exposed fins 101 to aid in fixture cooling, an adjustable armature 200 (also referred to as a knuckle) pivotable about at least one axis to aid in light directing, an external visoring system 300 pivotable at the distal end of housing 100 proximate an external lens 400 to aid in light redirecting, and a plurality of amiable LED modules 500 (see also FIG. 3B) sealed by lens 400 within housing 100 to aid in maximizing light output and flexibility in lighting design. The present embodiment is well suited for situations where pre-aimed or otherwise preset fixtures are desirable for a lighting application (e.g., so to minimize onsite installation error or increase the speed of installation), and is more specifically characterized according to the following.

1. Fixture Cooling

As envisioned, housing 100 is designed so to direct air over, through, up, and away from fixture 10; what is sometimes called a chimney effect. This is achieved not only by the wedge shape of housing 100 but also by a plurality of vertically running heat fins 101. Such efforts are necessary because, as is well known in the art, the efficacy, color rendering, and life span of LEDs are greatly impacted by temperature. An LED's temperature (e.g., junction temperature) fluctuates in accordance with ambient temperatures, the effectiveness of an associated heat sink, number of and proximity to other LEDs, and input power, to name a few factors well known in the art. Minimizing temperature increase is particularly important in the present invention because fixture 10, as envisioned, is suitable for use in sports lighting applications which have historically used traditional high wattage light sources (e.g., 1000 watt HID lamps) each of which produces a significant amount of light output (lumens). As can be appreciated, to approximate the light output of a single traditional light source such as the aforementioned, a large number of LEDs are needed, and that creates an immense or at least substantial amount of heat which must be effectively removed from the fixture; if not, the benefits of using LEDs may not be realized. In the alternative, though, cooling or heat removal techniques must not greatly impact fixture weight, cost, or EPA or the benefits of using LEDs may not outweigh the increased complexity and cost of the lighting system.

Accordingly, a number of cooling or heat removal techniques are employed; these are by way of example and not by way of limitation. Firstly, active cooling may be enabled using any number of preexisting conduits; for the example of sports lighting (see FIG. 5A), there typically exists an interior chamber in pole 1002 which runs the length of the pole up to an array of fixtures 1000 (e.g., to shield wiring from enclosure 1001 against environmental conditions). Further interior chambers could exist in knuckle 200 (see FIG. 2A) and portions 1011 and 1012 of fitter 1010 (see FIG. 5B), thereby establishing a constant airflow path from the ground to the top of an array; see, for example, U.S. application Ser. No. 13/471,804 (now U.S. Pat. No. 8,789,967) and U.S. application Ser. No. 13/791,941 (now U.S. Pat. No. 9,028,115), both of which are incorporated by reference in their entireties. Of course, this does not preclude creating conduits for use as an airflow path rather than relying on preexisting ones, or relying upon passive cooling as opposed to forced air or other active cooling techniques.

Secondly, a constant heat dissipation path exists between LED modules 500 and the exterior of fixture 10. As can be seen from FIG. 3B, one or more LEDs 501 are positioned in a holder 505 which is directly affixed to an interior surface 102 of housing 100 via fastening devices 506 or analogous components; note that for the sake of brevity, only four devices 506 and complementary holes in surface 102 are illustrated in FIG. 3B. Heat is transferred from LEDs 501 to surface 102 to the body of housing 100 to fins 101 and, ultimately, away from fixture 10.

Finally, as envisioned some number of LEDs 501 share a single optical element (e.g., lens 502); this may be in accordance with U.S. application Ser. No. 13/623,153 (now U.S. Pat. No. 8,866,406), incorporated by reference herein, or otherwise. As can be seen from FIG. 3B, a lens 502 is seated in holder 505 and positionally affixed via plate 507 such that it encapsulates eight LEDs 501. Thus, for this example, a total of twelve lenses 502 (i.e., ninety-six LEDs) are in each fixture 10. This increases the total potential light output while decreasing the electrical current demands for any one LED 501 to produce said output, and in a manner that both preserves the compact nature of the fixture and reduces cost (by omitting additional parts 502, 505, and 507).

In practice, a fixture such as that illustrated in FIGS. 2A-H employing twelve LED modules each containing four XM-L LEDs (available from Cree, Inc., Durham, N.C., USA)—a total of forty-eight LEDs—shows a significant decrease in junction temperature when active cooling is present; a sampling of data is shown in Table 1. It is of note that junction temperature was calculated using a combination of manufacturer data, thermal modeling, and the methods described in aforementioned U.S. application Ser. No. 13/623,153 (now U.S. Pat. No. 8,866,406), though there are a variety of methods which could be used and provide a useful comparison between using active cooling and not (irrespective of the accuracy of calculating absolute values).

TABLE 1

| | Embodiment 1-no active cooling | | | | Embodiment 1-with active cooling | | | |
|---|---|---|---|---|---|---|---|---|
| Fixture Power (W) | 45.9 | 109.5 | 184.1 | 245.0 | 46.2 | 110.7 | 186.7 | 249.1 |
| Junction Temp (C.) | 36.9 | 52.8 | 70.8 | 85.4 | 29.4 | 42.3 | 57.0 | 68.9 |
| Efficacy (lm/W) | 147.1 | 130.4 | 114.5 | 103.6 | 148.3 | 132.1 | 116.7 | 106.2 |
| Fixture Output (lm) | 6745 | 14279 | 21072 | 25384 | 6859 | 14629 | 21783 | 26445 |

As can be seen from Table 1, as fixture power is increased, LED efficacy decreases; this is true for both cases but less so for fixture 10 when active cooling is present. Thus, when designing a lighting system employing fixtures 10, one may balance efficacy, longevity, and total light output versus the cost of the various cooling techniques described herein to determine an acceptable balance for a lighting application. This may be in accordance with U.S. application Ser. No. 13/399,291 (now U.S. Pat. No. 9,581,303), incorporated by reference herein, or otherwise.

A similar reduction to decreasing efficacy can be seen when transitioning from horizontal heat fins to the vertical heat fins illustrated in FIGS. 2A-H; a sampling of data is shown in Table 2 for a similar fixture arrangement as Table 1 (forty-eight Cree XM-L2 LEDs were used). Again, as power is increased, overall light output increases and efficacy decreases but the light output increase is more pronounced and the efficacy decrease is diminished when choosing the more favorable fixture design (i.e., vertical heat fins). This is attributed to a lower junction temperature which is the result of the vertical fins being a more effective heat sink than the horizontal fins.

TABLE 2

| | Embodiment 1-horizontal fins | | | | Embodiment 1-vertical fins | | | |
|---|---|---|---|---|---|---|---|---|
| Fixture Power (W) | 47.5 | 112.7 | 188.6 | 250.9 | 47.6 | 113.2 | 190.0 | 253.5 |
| Junction Temp (C.) | 35.0 | 51.4 | 71.1 | 88.2 | 31.9 | 43.0 | 56.6 | 68.5 |
| Efficacy (lm/W) | 188.6 | 165.7 | 144.3 | 129.8 | 189.5 | 168.0 | 147.9 | 134.4 |
| Fixture Output (lm) | 8967 | 18672 | 27220 | 32575 | 9024 | 19007 | 28108 | 34074 |

2. Effective Projected Area

In addition to being designed for thermal management, housing 100 is designed so to demonstrate little resistance to air flow, i.e., to have a low effective projected area (EPA). As previous stated, a low EPA is critical for outdoor lighting applications and particularly sports lighting applications where a plurality of fixtures are elevated above a target area and subject to severe wind loading. Additional details regarding how to design for low EPA in sports or other wide area lighting fixtures can be found in U.S. Provisional Application Ser. No. 61/708,298 incorporated by reference herein. Table 3 illustrates various measurements related to wind loading for a previous design of fixture housing (see Embodiment 2 and aforementioned U.S. application Ser. No. 13/471,804 (now U.S. Pat. No. 8,789,967)) and fixture housing 100 of the present embodiment. FIG. 6 illustrates wind direction and relevant aiming angles related to Table 3.

TABLE 3

| | Embodiment 2 (FIG. 6-left) | | | Embodiment 1 (FIG. 6-right) | | |
|---|---|---|---|---|---|---|
| Wind Direction | 1 | 2 | 3 | 1 | 2 | 3 |
| Wind Speed (mph) | 150 | 150 | 150 | 150 | 150 | 150 |
| Projected Area ($in^2$) | 46.9 | 54.7 | 46.9 | 76.9 | 29.0 | 76.9 |
| Drag Coefficient | 0.93 | 0.68 | 0.89 | 0.55 | 1.06 | 1.09 |
| EPA ($ft^2$) | 0.30 | 0.26 | 0.29 | 0.29 | 0.21 | 0.58 |

It can be seen from Table 3 that EPA is comparable between the previous housing design (Embodiment 2) and housing 100 of the present embodiment; note that Table 3 provides EPA measurements for housing 100 without visor 300 (see FIG. 6). A benefit is that housing 100 has a larger internal space and can accommodate more lenses; for example, housing 100 can accommodate twelve lenses 502 designed to encapsulate four XM-L LEDs each whereas the housing of the previous design was limited to nine lenses of the same design. Of course, neither embodiment is limited to a particular width of fixture. The fixtures of Embodiments 1 and 2 described herein could be shorter or longer along axis 3000 (see FIG. 2D) so to accommodate any number of LEDs (or other light sources) and not depart from at least some aspects according to the present invention.

A variety of factors influence the EPA of a lighting fixture or an array of lighting fixtures. For example, pivoting secondary visor 300 (see FIG. 4B) may adversely affect the EPA of fixture 10 if secondary visor 300 extends below the plane of sealing lens 400; this is likewise true for an optional visor/light blocking member 305 (see FIG. 4E) which prevents light from being projected behind the pole (e.g., as may be necessary to prevent light from reaching residences behind a field). That being said, side walls 304 (see FIGS. 2G and 2H) of secondary visor 300 follow the design of housing 100 so to minimize this effect. Further, visoring (see FIG. 4A) has been divided up amongst internal visor(s) 503 and inner surface 303 of secondary visor 300, each of which may be independently pivotable. Not only does this aid in light redirecting efforts, but permits a designer to keep the visoring system compact, thus reducing EPA compared to traditional sports lighting fixtures with long external visors.

Other design selections or optional features could also impact the EPA of fixture 10. For example, the location of knuckle 200 on fixture 10 (See FIG. 2A) will likely impact EPA. The number of fixtures in an array and the degree to which each may be pivoted about one or more axes will likely impact EPA. Assume, for example, portions 1012 of fitter 1010 (see FIG. 5B) are pivotable (e.g., via additional knuckles 200 or otherwise); a resulting array (see FIG. 7) would likely have a different EPA than that of array 1000

(see FIGS. 5A and B). Table 4 illustrates various measurements related to wind loading for a single fixture housing 100 and an array of three fixture housings 100 commensurate with FIG. 7; again, visor 300 has been omitted.

TABLE 4

| | Single fixture housing 100 | | | Three fixture housings 100 | | |
|---|---|---|---|---|---|---|
| Wind Direction | 1 | 2 | 3 | 1 | 2 | 3 |
| Wind Speed (mph) | 150 | 150 | 150 | 150 | 150 | 150 |
| Projected Area (in$^2$) | 76.9 | 29.0 | 76.9 | 181.0 | 87.1 | 181.0 |
| Drag Coefficient | 0.55 | 1.06 | 1.09 | 0.48 | 1.15 | 0.74 |
| EPA (ft$^2$) | 0.29 | 0.21 | 0.58 | 0.60 | 0.69 | 0.93 |

3. Light Directing Means

As has been stated, light directing means may be achieved via lenses, filters, pivoting of one or more components of the fixture or other structural members of the lighting system, and so on. More specifically, fixture 10 may be pivoted about a first pivot axis 2000 (see FIG. 2C) and a second pivot axis 3000 (see FIG. 2D) relative fitter 1010 or other structural member via knuckle 200; as envisioned, knuckle 200 is of the design disclosed in U.S. application Ser. No. 12/910,443 (now U.S. Publication No. 2011/0149582) incorporated by reference herein, though this is by way of example and not by way of limitation. Indeed, if crossarm 1012 (see FIG. 5B) is also connected to a fitter, pole, or otherwise via knuckle 200 or analogous device, there exists a large range of aiming angles for any given fixture 10 relative a target area. As an added benefit, the design of array 1000 and knuckle 200 is such that internal conduits are preserved regardless of aiming angles which (i) ensures a path for active cooling and (ii) ensures wiring will be shielded from moisture or other adverse environmental conditions (portending suitability for outdoor use).

Additional light directing means is provided within LED module 500. The aiming angle of any LED or grouping of LEDs 501 may be achieved by changing the angle of surface 102 within the interior of housing 100. Compare, for example, modules 500A and 500B of FIG. 4C; a constant heat dissipation path is preserved by directly mounting said modules to surfaces 102A and 102B, respectively, but a different aiming angle is effectuated for each. If changes to the aiming angle of a module are needed after manufacturing, a wedge-shaped insert (see, for example, FIG. 9 of aforementioned U.S. Prov. Application Ser. No. 61/708,298)—preferably formed from the same thermally conductive material (e.g., aluminum) as housing 100—may be used and still preserve the integrity of the heat sink.

Additional light directing means may be provided via design of lens 502 (see FIG. 3B). For example, a lens 502 encapsulating a first subset of LEDs may produce an elliptical beam elongated in a first plane (e.g., along axis 3000, FIG. 2D) and a second lens 502 of the same design encapsulating a second subset of LEDs may be rotated 90° so to produce an elliptical beam elongated in a second plane (e.g., along axis 2000, FIG. 2C). Lens 502 may include a coating or filtering component so to selectively transmit a particular portion of the light emitted from an LED or otherwise effectuate a color change; see, for example, U.S. Prov. Application Ser. No. 61/804,311 incorporated by reference herein. Of course, a filtering member could be a discrete device within or proximate module 500.

Lastly, as envisioned LED modules 500 are mounted within housing 100 in a single row (regardless of the layout of LEDs 501 within module 500); this is a subtlety to the fixture design and, perhaps, counter-intuitive as one would normally attempt to stack modules so to maximize the number of light sources in a given fixture. However, it has been found that stacking modules in this manner is not suitable for a floodlight-type lighting application or other lighting applications that require high lighting uniformity—i.e., not the general lighting applications in which LEDs have been widely used—as the optical devices in each row of modules interacts with the row stacked above and below so to produce undesirable lighting effects such as shadowing and uneven illumination when the fixture is pivoted.

4. Light Redirecting Means

As has been stated, light redirecting means may be achieved via reflectors, visors, light absorbing members, diffusers, and so on. More specifically, in the present embodiment light redirecting means are divided into two stages: those within housing 100, and those external to housing 100. As has been stated, by dividing up light redirecting efforts, one gains additional flexibility in addressing the lighting needs of an application and eliminates very long external visors that provide glare control but greatly increase EPA.

A first stage of light redirecting means comprises one or more reflective or light blocking elements within fixture housing 100. FIG. 3B illustrates a reflective strip 503 which is positionally affixed at a desired angle relative LEDs 501 via a bracket 504 (see also FIG. 4D); note that for brevity a number of fastening devices have been omitted from FIG. 3B. Reflective strip 503 could be singular or plural (e.g., so to effectuate different lighting effects for different LED modules 500), could be processed (e.g., peened) or otherwise formed so to produce a specific material finish or lighting effect (e.g., diffuse reflection), and, if desired, could be pivotable about the same axis as light redirecting means external to fixture housing 100. Further, one or more similar reflective strips 508 could be inserted between one or more modules so to prevent horizontal spread (i.e., along axis 3000) or otherwise blend the light produced from each module so to produce a desired composite output from each fixture 10. Of course, a reflective material inserted between one or more modules need not be in strip form; FIG. 9 of aforementioned U.S. application Ser. No. 13/471,804 (now U.S. Pat. No. 8,789,967) illustrates an individual reflector which could be positioned in holder 505 about a lens 502 so to redirect light in the manner just described. And, of course, optical elements other than a reflective strip may achieve similar light redirecting effects. For example, a diffuser (e.g., as is discussed in U.S. application Ser. No. 12/604,572 (now U.S. Pat. No. 8,734,163), incorporated by reference herein) proximate LED module 500 or lens 400 may achieve a similar beam spreading effect as reflective strip 503; either, or both, could be used depending on the desired transmission efficiency, perceived source size, and beam pattern, for example.

A second stage of light redirecting means comprises one or more reflective or light blocking elements external to housing 100. In the present embodiment, a secondary visor 300 (see FIGS. 2A-F and 4A-E) includes an inner surface 303 which may be reflective (similar to strip 503) or light absorbing; if the former, then upon pivoting visor 300 light is reflected back onto the target area but the center/maximum intensity of the beam may shift, and if the latter, the beam shape/size/intensity will not change upon pivoting visor 300 but light is absorbed and, therefore, wasted. Having both reflective and non-reflective options for surface 303 is beneficial as there are design opportunities for both. Indeed, a wide range of lighting effects can be achieved by modifying options such as material selection, material processing, the degree to which surfaces 303 and 503 may be pivoted (e.g., so to provide extreme glare control), and inclusion of additional elements which redirect light (e.g., reference no. 305, FIG. 4E). Some of the possible lighting effects are presently discussed.

a) Glare Control

As envisioned, glare control is divided into two stages; onsite (i.e., at the target area) and offsite (e.g., at window level of a home neighboring a sports field). Glare control offsite is primarily achieved by pivoting external visor 300 relative housing 100 via bracket system 307 and associated fastening devices 306 (see FIG. 3A). Because visor 300 pivots at the distal end of fixture housing 100 (see uppermost fastening device 306 of FIG. 3A), and because reflective strip 503 extends from module 500 to the distal end of housing 100 (see FIG. 4A), there exists a relatively uninterrupted reflective surface for light redirecting regardless of pivoting of visor 300 (see FIG. 4B). This design feature provides a greater range of cutoff angles without adversely impacting EPA (e.g., as would be the case if fixture 10 comprised a long, static external visor). In practice, visor 300 could be pivoted a desired amount so to provide distinct cutoff which prevents offsite persons from directly viewing the light sources (i.e., LEDs 501). The degree to which visor 300 may be pivoted is dependent upon the size and position of the arcuate slots in side walls 304 (See FIG. 3A); in this example, angle A (see FIG. 4B) is approximately 26°, though other angles are possible.

On site, it is virtually impossible to completely eliminate glare as there is almost certainly persons positioned under a fixture, as players on a field 5 are in a sports lighting application (see FIGS. 1A-C). Therefore, simply providing cutoff via visor 300 is insufficient as persons at the target area would still be able to directly view the light source, even if persons offsite could not. As is well known in the art, directly viewing an intense light source can cause discomfort or pain in a person, or render a person unable to complete a task—what is known as discomfort or disability glare, respectively. The severity of glare depends on the contrast between the light source and the background, size of the light source, and adaptivity of the human eye, for example. U.S. application Ser. No. 12/887,595 (now U.S. Pat. No. 8,517,566), incorporated by reference herein discusses glare, its effect on persons, and how that relationship places restrictions on lighting; see also "Effect of different coloured luminous surrounds on LED discomfort glare perception" by Hickcox, K. et al, published in *Lighting Research and Technology* on Feb. 20, 2013. As adaptivity and background contrast are relatively fixed for most lighting applications, one aspect of the present embodiment relies upon increasing the source size to minimize onsite glare. To that end, inclusion of reflective strip 503 within housing 100 not only aids in light redirecting efforts, but also serves to increase the perceived source size and, therefore, reduce glare. Persons at or proximate a target area directly viewing fixture 10 would not perceive twelve small, intense light sources (i.e., twelve modules 500) but rather, would perceive a swath of light extending the length of the fixture and the width of reflective strip 503. This swath of light is potentially greater in size if additional reflective redirecting elements are included, such as a rear component 305 (see FIG. 4E)—which prevents light from projecting behind fixture 10—or an additional pivot visor 300B (see FIG. 8C)—which allows a designer to produce both upper and lower cutoff (e.g., for race track lighting or targeted uplighting). Of course, there may still be areas of greater intensity near lenses 502 of modules 500, so a filtering or light diffusing component could be placed on or proximate lenses 502 to aid in further spreading out light; in essence, both increasing source size and reducing contrast. Also, in accordance with the aforementioned article in *Lighting Research and Technology*, some subset of LEDs within a module or some subset of modules within a fixture may project light of a perceivably different color (e.g., color temperature, spectral distribution) to aid in onsite glare control efforts.

The aforementioned glare control techniques not only reduce glare (both onsite and offsite) and not only do so in a manner that preserves the low EPA of the fixture, but when using reflective materials as opposed to light absorbing materials also redirects light that would otherwise be lost or wasted back to the target area. In practice, for a given target light level, a lighting designer could potentially reduce input power to LEDs 501 and still achieve the target light level if using the aforementioned glare control techniques because, ultimately, more of the light emitted from fixture 10 is harnessed and redirected. Said glare control techniques and associated apparatus could potentially be applied to existing fixtures of other designs to provide a retrofit solution for decreasing EPA, increasing glare control, and reducing input power.

b) Uplight

As envisioned, uplighting can be achieved from one or more fixtures 1/10 designed to solely provide uplight, or from one or more fixtures 1/10 which also contribute light to the target area. According to the former, a fixture 10 may be mounted on a pole 1002 (see FIG. 8A) low and upside down, as compared to other fixtures in array 1000. By pivoting knuckle 200, pivoting visor 300 (compare 300B versus 300A in FIG. 4B), changing the slope of surface 102 so to effectuate a different LED aiming angle (compare 102A versus 102B in FIG. 4C), changing the angle of reflective strip 503 relative LED modules 500 via pivoting or shaping of bracket 504 (compare 503A-C in FIG. 4D), or by adding additional light redirecting means (e.g., reference no. 305, FIG. 4E), nearly any desired spread of light may be achieved; see angle A, FIG. 8A.

Sometimes, though, due to potential theft or safety issues, it may not be desirable to mount fixtures within a person's reach. It is often also undesirable to mount a fixture midway or at some other intermediate height along a pole as this damages the overall aesthetic of a lighting installation. Therefore, it is desirable to also provide uplighting from a fixture mounted within array 1000. Looking now at FIGS. 8B and 8C, one solution is to mount a fixture 1 in accordance with other fixtures in array 1000, aim said fixture upwardly (e.g., via knuckle 200), pivot a first external pivot visor 300A downward to provide an upper cutoff 1003, and pivot a second external pivot visor 300B so to direct light upward for uplighting. An upper cutoff may be desirable, for example, in a sports lighting application. While a defined target area may include the space above field 5 (e.g., so to illuminate a ball in flight), said space is confined to a certain size or shape; there is no point in illuminating a space higher than an object can fly or persons can view. Thus, providing an upper cutoff harnesses the light emitted from a fixture and redirects it in a useful manner. Lower pivot visor 300B could pivot about the same axis as 300A and be of comparable shape and size so to provide a defined lower cutoff 1004 and confine uplighting to an angle B. Having both a well defined upper and lower cutoff may be desirable, for example, in a race track lighting application where one wishes to illuminate a car on a track but not spectators above the track (necessitating an upper cutoff) or empty grass space in the infield below the track (necessitating a lower cutoff); U.S. Pat. No. 5,595,440 incorporated by reference herein discusses the art of race track lighting in greater detail. Alternatively, lower pivot visor 300B could be smaller, shorter, flatter, or of some other alternative composition as compared to upper visor 300A so to redirect some light emitted from fixture 1 towards pivot visor 300A but also permit some downlight (see alternative lower cutoff 1005 and beam spread angle C, FIG. 8B). Having a well defined upper cutoff and a less severe lower cutoff so to allow some downlight may be desirable, for example, in a race track lighting application where one wishes to illuminate a car on a track and not the spectators above the track, but also to illuminate the pit area in the infield. Of course, in the aforementioned example glare control may still be critical in the pit area even though the overall light level is lower than on the track—any of the aforementioned glare control means could be used in conjunction with fixture 1 or other embodiments of the invention.

5. Flexibility in Lighting Design

One possible method of illuminating a target area in accordance with aspects of the present invention is illustrated in flowchart form in FIG. 9. According to method 8000, a first step (see reference no. 8001) comprises identifying the lighting application. Step 8001 may comprise such things as mapping out the desired target area in all three dimensions, determining pole characteristics (e.g., size, location), determining ambient conditions (e.g., wind speed, average temperature) which may impact design choices, determining lighting characteristics (e.g., overall light level, max/min ratio of light levels measured between two defined points in the target area), and determining any desired lighting effects (e.g., specified color temperature, remote on/off control, preset dimming levels) which may be related to activities at said target area.

A second step 8002 comprises developing a lighting design—a composite beam pattern—which adequately illuminates the target area while adhering to the limitations/direction provided by step 8001. Step 8002 further comprises breaking down the composite beam pattern into one or more individual patterns each of which is associated with a pole location. As an alternative, a lighting designer may use a plurality of predetermined individual beam patterns to "build up" the composite beam pattern, much like a plurality of puzzle pieces—each an integral, but incomplete, part of a greater whole—are fit together in a precise way so to produce an intended design. Regardless of whether the composite beam is built up or broken down, if desired, each individual pattern may at least partially overlap another pattern so to ensure even lighting—this approach is discussed in greater detail in aforementioned U.S. application Ser. No. 13/399,291 (now U.S. Pat. No. 9,581,303).

A third step 8003 comprises developing the lighting fixtures in accordance with the composite beam pattern. Generally, each individual beam pattern is associated with a pole location; however, depending on the size, shape, color, intensity, etc. an individual beam pattern may be associated with multiple pole locations. Each pole location is associated with one or more lighting fixtures elevated and affixed to said pole, each of said lighting fixtures is associated with one or more LED modules, and each of said modules is associated with one or more optical elements and light sources. So it can be seen that the complexity of step 8003 is both selectable and variable. If desired, a lighting designer may have some number of "standard" fixtures from which to choose, and may modify said standard fixtures so to produce fixtures which, when taken as a whole, produce an output approximating the composite beam pattern. Alternatively, a lighting designer could custom build each lighting system from the module level up so to produce a desired composite beam pattern. Regardless of how customized a lighting system is, or how complex step 8003 is, the result is a plurality of components (e.g., knuckles, lighting fixtures, crossarms, poles, wiring, control circuitry, etc.) and directions (e.g., diagrammatic pole layout, lighting scan, aiming diagram, etc.) for producing the composite beam pattern based on the limitations/direction provided by step 8001.

A fourth step 8004 comprises installing the lighting system at the target area. The mechanics of installing a lighting system in accordance with a series of directions is well known in the art and discussed in aforementioned U.S. Pat. No. 7,458,700. That being said, given the possible complexity of step 8003 and the truly customizable nature of fixtures 10, it is likely installation on site, even by experienced technicians, could result in error and, therefore, have adverse effects on the composite beam pattern. Thus, if desired, fixtures 10 could be pre-assembled and pre-aimed at the factory. The aiming of pivot visor 300 can be predetermined and fixed via bolts 306 in bracket 307, knuckle 200 may be adjusted and locked (see aforementioned U.S. application Ser. No. 12/910,443 (now U.S. Publication No. 2011/0149582)), the angle of surface 102 may be machined, LED modules 500 with the appropriate number and type of LEDs 501 and optical elements 502 may be assembled, and the angle of reflective strip 503 fixed by bracket 504—all prior to shipping. If desired, an entire array 1000 of pre-aimed fixtures 10—prewired and sealed against moisture—could be shipped.

An optional step 8005 comprises adjusting the lighting system after installation. One may find that an unacceptable amount of light shoots behind a pole and off site, thereby necessitating the need for reflective or light absorbing component 305. One may find that the target area itself has changed (e.g., due to recent construction) and so a particular visor 300 must be pivoted down further to reduce glare. In doing so, one may find that the center/maximum intensity of the individual beam pattern has shifted and so to preserve a more uniform composite beam pattern, a lighting designer may choose to replace the affected pivot visor 300 with a longer one (accepting the adverse impact to EPA). The aforementioned are but a few examples of overcoming challenges so to preserve the desired composite beam pattern after a lighting system is already installed; step 8005 may comprise additional or alternative approaches/methodologies.

C. Exemplary Method and Apparatus Embodiment 2

There may be instances where a lighting designer or other person(s) elects a fixture design more suitable for onsite adjustability, albeit at a cost. For example, fixture 12 of aforementioned U.S. application Ser. No. 13/471,804 (now U.S. Pat. No. 8,789,967), to which the present application claims priority is similar in design to fixture 10 of Embodiment 1 herein, but readily permits onsite pivoting of LEDs contained within a housing (see FIGS. 4A-C of Ser. No. 13/471,804). While the aiming angle of LEDs 501 is fixed via surface 102 of housing 100 in Embodiment 1 herein, their aiming angles can be adjusted in situ via the aforementioned wedge-shaped inserts; however, this is much less convenient than pivoting enclosure 24 of fixture 12 of Ser. No. 13/471,804 (i.e., Embodiment 2 herein). This convenience comes at a cost, though, in that fixture 12 accommodates fewer LEDs than fixture 10 (assuming a comparable size). One may find, however, that the additional flexibility in addressing lighting needs on site warrants the reduction in LED quantity.

D. Options and Alternatives

The invention may take many forms and embodiments. The foregoing examples are but a few of those and variations obvious to those skilled in the art will be included within the invention. To give some sense of some options and alternatives, a few specific examples are given below.

Various apparatus and methods of affixing one component to another have been discussed; most often in terms of a fastening device. It is to be understood that such a device is not limited to a bolt or screw, but should be considered to encompass a variety of apparatus and means of coupling parts (e.g., gluing, welding, clamping, etc.). For example, the partially exploded views of FIGS. 3A and B, and the section views of FIGS. 4A-E do not illustrate any sort of fastening device affixing reflective surface 303 to structural support 301 nor any sort of fastening device affixing reflective surface 503 to bracket 504 because, as envisioned, said reflective surfaces are glued in situ so not to deform the reflective surface and affect the beam pattern.

Likewise, various optical elements have been discussed; most often in terms of a lens 502. It is to be understood that optical elements could comprise a variety of light directing or light redirecting members (e.g., reflector, diffuser, filter, etc.). Still further, some light directing means comprise structural members which permit pivoting about one or more axes; most often embodied as an adjustable armature (i.e., knuckle). It is to be understood that, while pivoting—and particularly independent pivoting—of different portions of a lighting fixture are of importance, the exact number and position of pivot axes and the means by which said portions are pivoted may differ from those described herein and not depart from at least some aspects according to the present invention.

As envisioned, a majority of components of the fixtures of Embodiments 1 and 2 are machined, punched, stamped, or otherwise formed from aluminum or aluminum alloys; this allows a distinct and uninterrupted thermal path to dissipate heat from LEDs contained therein. However, it is possible for said components to be formed from other materials and using a variety of forming methods or processing steps, and not depart from at least some aspects according to the present invention, even without realizing the benefit of heat dissipation.

Likewise, a majority of components in array 1000 are formed with interior channels such that wiring may be run from LEDs 501 to the bottom of pole 1002 without exposing wiring to moisture or other adverse effects, and to provide a path for active cooling. However, it is possible for said components to be formed without such interior channels and not depart from at least some aspects according to the present invention, even without realizing the benefit of active cooling techniques.

Several examples of devices used for light directing and light redirecting have been given; this is by way of example and not by way of limitation. While any of these devices (e.g., lenses, diffusers, reflectors, visors, etc.) could be used individually or in combination for a particular lighting application, it should be noted that the fixtures of Embodiments 1 and 2 are not restricted to any particular combination of parts, design, or method of installation, and may comprise additional devices not already described if appropriate in creating a desired composite beam pattern.

With regards to a lighting system comprising one or more fixtures 1/10/12, power regulating components (e.g., drivers, controllers, etc.) may be located remotely from said fixtures, may be housed in an electrical enclosure 1001 affixed to an elevating structure such as is illustrated in FIGS. 5A, 8A, 8B and is discussed in U.S. Pat. No. 7,059,572 incorporated by reference herein, or may be located somewhere on fixture a 1/10/12. Further, control of power to the light sources contained in a fixture 1/10/12 may be effectuated on site or remotely such as is described in U.S. Pat. No. 7,209,958 incorporated by reference herein. A variety of approaches could be taken to provide power to a lighting system incorporating Embodiments 1 and 2 and not depart from at least some aspects according to the present invention.

Finally, as previously stated, aspects of the present invention may be applied to a variety of lighting applications. For example, the ability of a single fixture 1/10/12 to create multiple lighting effects (e.g., uplighting and downlighting, some subset of LEDs one color and another subset another color) may be well suited to theatrical lighting or façade lighting applications. As another example, the ability of a single fixture 1 (see FIGS. 8A-C) to provide a distinct upper and lower cutoff with little to no light loss, and in a manner that prevents glare, may be well suited to aisle lighting, race track lighting, or downlighting applications. As yet another example, the ability of a fixture 1/10/12 to be pivoted in nearly any direction (e.g., via one or more knuckles 200) may be well suited to generic roadway lighting applications in which it is desirable to project light forward of a driver so to aid in glare reduction regardless of topography or curvature in the road; this concept is discussed in aforementioned U.S. application Ser. No. 12/887,595 (now U.S. Pat. No. 8,517,566).

What is claimed is:

1. A method of illuminating a target area according to a composite beam pattern comprising:

a. identifying one or more factors related to the target area;

b. developing a plurality of individual beam patterns which, when assembled, approximates the composite beam pattern;

c. developing a lighting system comprising a plurality of lighting fixtures each of which produces an output from a plurality of light sources contained therein and which contributes to at least one individual beam pattern and comprises:

i. said plurality of light sources pivotable about at least one axis;

ii. one or more light directing means associated with said plurality of light sources and contained within said lighting fixture and pivotable about at least one axis;

iii. one or more light redirecting means associated with said plurality of light sources and contained within said lighting fixture to provide a first step of redirection of said output from within the lighting fixture; and iv. one or more light redirecting means associated with said plurality of light source but not contained within said lighting fixture and pivotable about at least one axis and independently pivotable of said light directing means to provide a second step of redirection of said output from outside the lighting fixture; and d. installing the lighting system at the target area so to produce the composite beam pattern including first and second light redirecting steps.

2. The method of claim 1 wherein the one or more factors related to the target area comprises one or more of:

a. size of the target area;

b. shape of the target area;

c. number and layout of one or more elevating structures to which said one or more lighting fixtures are affixed;

d. wind conditions;

e. temperature conditions;

f. light level;

g. lighting uniformity; and h. color of light.

3. The method of claim 1 wherein said light directing means comprises one or more of:

a. a lens;

b. a structural component of the lighting system; and c. a filter.

4. The method of claim 1 wherein both said light redirecting means contained within the lighting fixture and said light redirecting means not contained within the lighting fixture comprise one or more of:

a. a reflective device;

b. a diffuser; and c. a light absorbing device.

5. The method of claim 1 wherein one or more of the at least one axis for the light sources, light directing means and light redirecting means is parallel to the target area.

6. The method of claim 1 wherein two of the at least one axis for the light sources, light directing means and light redirecting means are offset from one another either in spacing or direction.

7. The method of claim 1 wherein the light sources are solid state light sources.

8. The method of claim 1 wherein the target area comprises a sports field.

9. The method of claim 1 wherein the fixtures are elevated on elevating structures at pre-determined locations relative to the target area.

10. The method of claim 9 wherein a first portion of the fixtures are mounted lower on said elevating structures than a second portion of the fixtures, and wherein the output of the first portion of fixtures contributes to one or more different individual beam patterns than the second portion of fixtures when installed at the target area.

11. A lighting fixture comprising:

a. a housing having a first end, a second end, a length of body therebetween, an internal space in the body between the first and second ends, and an opening in the body into the internal space;

b. a light transmissive device sealed against the opening in the body;

c. one or more light sources mounted within the internal space of the body of the housing nearest the first end and at a predetermined angle relative the light transmissive device, each light source producing a light output;

d. one or more reflective devices mounted within the internal space of the body of the housing at a predetermined angle relative the light transmissive device and adapted to redirect the light output of the light sources;

e. one or more reflective devices mounted proximate the light transmissive device at the second end of the body outside the internal space and adapted to redirect the light output of the light sources; and f. a pivoting device adapted to pivot the one or more reflective devices mounted at the second end of the body about an axis extending transversely through the body of the fixture and nearer the second end of the fixture than the first end.

12. The lighting fixture of claim 11 wherein the one or more reflective devices mounted within the internal space of the housing comprises one or more reflective strips between said one or more light sources.

13. The lighting fixture of claim 11 further comprising a visor pivotably mounted at the second end of the body outside the internal space, and wherein the one or more reflective devices mounted outside the internal space of the housing comprises a reflective surface of said visor.

14. The lighting fixture of claim 11 further comprising a heat management component associated with the housing.

15. The lighting fixture of claim 14 wherein the heat management component comprising at least one of an active or passive heat removal system.

16. The lighting fixture of claim 14 wherein the heat management component comprises a heat sink comprising a plurality of exposed fins extending outwardly from the housing and in direct thermal contact with the light sources.

* * * * *